(12) United States Patent
Canich et al.

(10) Patent No.: US 11,613,593 B2
(45) Date of Patent: Mar. 28, 2023

(54) ANSA-BIS(INDEN-2-YL) CATALYSTS FOR PRODUCING VINYLIDENE-TERMINATED POLYALPHAOLEFINS

(71) Applicant: ExxonMobil Chemical Patents Inc., Baytown, TX (US)

(72) Inventors: Jo Ann M. Canich, Houston, TX (US); Jian Yang, Houston, TX (US); Alexander Z. Voskoboynikov, Moscow (RU); Andrey F. Asachenko, Chelyabinsk (RU); Oleg V. Samsonov, Moscow (RU); Georgy P. Goryunov, Moscow (RU)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/173,850

(22) Filed: Feb. 11, 2021

(65) Prior Publication Data
US 2021/0269561 A1    Sep. 2, 2021

Related U.S. Application Data

(60) Provisional application No. 62/980,809, filed on Feb. 24, 2020.

(51) Int. Cl.

| C07F 17/00 | (2006.01) |
|---|---|
| C08F 4/6592 | (2006.01) |
| C08F 4/642 | (2006.01) |
| C08F 4/659 | (2006.01) |
| C08F 10/02 | (2006.01) |
| C08F 10/06 | (2006.01) |

(52) U.S. Cl.
CPC .......... *C08F 4/65927* (2013.01); *C07F 17/00* (2013.01); *C08F 4/6428* (2013.01); *C08F 4/65908* (2013.01); *C08F 10/02* (2013.01); *C08F 10/06* (2013.01)

(58) Field of Classification Search
CPC .............................. C08F 4/65927; C07F 17/00
See application file for complete search history.

(56) References Cited

U.S. PATENT DOCUMENTS

| 3,367,987 A | 2/1968 | Walsh ........................... 260/677 |
|---|---|---|
| 5,145,189 A | 9/1992 | Pope ............................... 277/3 |
| 5,243,001 A | 9/1993 | Winter et al. .................. 526/127 |
| 5,602,219 A | 2/1997 | Aulbach et al. .............. 526/160 |
| 5,741,868 A | 4/1998 | Winter et al. .................. 526/127 |
| 6,121,185 A | 9/2000 | Rosen et al. .................... 502/164 |
| 6,191,294 B1 | 2/2001 | Resconi et al. ................. 556/11 |
| 6,268,518 B1 | 7/2001 | Resconi et al. ................. 556/43 |
| 6,306,791 B2 | 10/2001 | Schaverien et al. .......... 502/117 |
| 6,342,622 B1 * | 1/2002 | Arts ........................ C07F 7/081 502/103 |
| 6,403,732 B2 | 6/2002 | Marks et al. .................. 526/134 |
| 6,420,507 B1 | 7/2002 | Kale et al. ..................... 526/348 |
| 6,423,796 B1 | 7/2002 | Resconi et al. ............... 526/160 |
| 6,613,713 B2 | 9/2003 | Becke et al. ................... 502/104 |
| 6,693,156 B1 | 2/2004 | Resconi et al. ............... 526/165 |
| 6,818,585 B2 | 11/2004 | Crowther et al. ............. 502/117 |
| 7,087,602 B2 | 8/2006 | Thomas et al. ............. 514/234.5 |
| 7,169,864 B2 | 1/2007 | Paczkowski et al. ........ 526/129 |
| 7,199,072 B2 | 4/2007 | Crowther et al. ............. 502/113 |
| 7,214,745 B2 | 5/2007 | Arai et al. ..................... 526/153 |
| 8,318,998 B2 | 11/2012 | Crowther et al. ............. 585/253 |
| 8,399,724 B2 | 3/2013 | Crowther et al. ............... 585/10 |
| 8,426,659 B2 | 4/2013 | Holtcamp et al. ............... 585/10 |
| 8,501,894 B2 | 8/2013 | Crowther et al. ............... 528/31 |

(Continued)

FOREIGN PATENT DOCUMENTS

| CN | 105622807 | 3/2019 | ............ C08F 110/06 |
|---|---|---|---|
| EP | 0283739 | 5/1995 | ............ C08F 10/00 |
| EP | 0955304 | 9/2003 | ............ C07F 17/00 |
| JP | 2001/220408 | 8/2001 | ............ C08F 10/06 |
| JP | 2005-336092 | 12/2005 | ............ C07F 17/00 |
| JP | 2011-037164 | 2/2011 | ............ B29B 9/02 |
| KR | 17250040000 | 4/2017 | ............ C08F 4/6592 |

(Continued)

OTHER PUBLICATIONS

U.S. Appl. No. 12/642,453, filed Dec. 18, 2009, Ng, M. K. et al.
U.S. Appl. No. 16/394,166, filed Apr. 25, 2019, Faler, C. A. et al.
CAS 909721-53-5.
CAS 943521-08-2.

(Continued)

*Primary Examiner* — Caixia Lu
(74) *Attorney, Agent, or Firm* — ExxonMobil Chemical Patents Inc.

(57) ABSTRACT

Metallocene complexes represented by the structure below are useful for alpha olefin oligomerization in the presence of an activator to generate polyalphaolefins having a high percentage of vinylidene termination and relatively low Mn values.

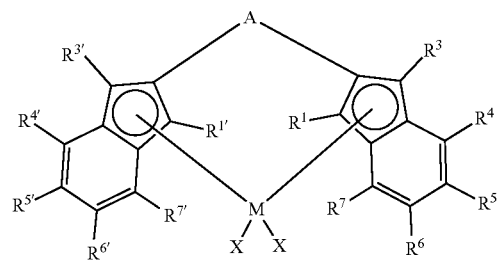

M is a group 4 transition metal. A is a bridging group having one bridging atom extending between a first indenyl ring and a second indenyl ring. Each X is independently an anionic ligand, or two Xs are joined and bound to M to form a metallocycle ring, or two Xs are joined to form a chelating ligand, a diene ligand, or an alkylidene ligand. $R^1$, $R^{1'}$, $R^3$, $R^{3'}$, $R^4$, $R^{4'}$, $R^7$ and $R^{7'}$ are hydrogen. $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

12 Claims, No Drawings

(56) References Cited

U.S. PATENT DOCUMENTS

| | | | |
|---|---|---|---|
| 8,623,974 B2 | 1/2014 | Jiang et al. | 526/134 |
| 8,642,497 B2 | 2/2014 | Berris | 502/202 |
| 8,669,326 B2 | 3/2014 | Hagadorn et al. | 525/157 |
| 8,669,330 B2 | 3/2014 | Stewart | 525/245 |
| 8,754,170 B2 | 6/2014 | Hagadorn et al. | 525/187 |
| 8,816,027 B2 | 8/2014 | Crowther et al. | 526/160 |
| 8,835,563 B2 | 9/2014 | Crowther et al. | 525/100 |
| 8,841,394 B2 | 9/2014 | Crowther et al. | 526/160 |
| 8,841,397 B2 | 9/2014 | Holtcamp et al. | 526/348.2 |
| 8,940,839 B2 | 1/2015 | Hagadorn et al. | 525/268 |
| 8,981,029 B2 | 3/2015 | Jiang et al. | 526/348 |
| 9,309,340 B2 | 4/2016 | Ishihama et al. | C08F 210/16 |
| 2004/0102590 A1 | 5/2004 | McCullough et al. | 526/170 |
| 2005/0159299 A1 | 7/2005 | Rodriguez et al. | 502/103 |
| 2005/0239981 A1 | 10/2005 | Voskoboynikov et al. | 526/160 |
| 2009/0318644 A1 | 12/2009 | Brant et al. | 526/170 |
| 2010/0038290 A1 | 2/2010 | Wang et al. | 208/48 |
| 2011/0137060 A1 | 6/2011 | Chevalier et al. | 556/53 |
| 2014/0275455 A1* | 9/2014 | Al-Shammari | C08F 4/00 526/170 |
| 2015/0203602 A1 | 7/2015 | Sun et al. | C08F 4/52 |
| 2016/0244535 A1 | 8/2016 | Canich et al. | C08F 4/76 |
| 2017/0233516 A1 | 8/2017 | Yang et al. | C08F 232/08 |
| 2018/0094088 A1 | 4/2018 | Crowther et al. | C08F 210/02 |
| 2018/0148522 A1* | 5/2018 | Vadake Kulangara | C08F 4/6592 |
| 2018/0282359 A1 | 10/2018 | Crowther et al. | C07F 17/00 |
| 2018/0282443 A1 | 10/2018 | Crowther et al. | C08F 4/65927 |
| 2019/0119418 A1 | 4/2019 | Yang et al. | C08F 210/14 |
| 2019/0135961 A1 | 5/2019 | Joung et al. | C08F 210/16 |
| 2019/0248936 A1 | 8/2019 | Yang et al. | C08F 210/16 |
| 2019/0263942 A1 | 8/2019 | Jeong et al. | C08F 4/65925 |

FOREIGN PATENT DOCUMENTS

| | | | |
|---|---|---|---|
| WO | WO1994/011406 | 5/1994 | C07F 17/00 |
| WO | WO1995/027717 | 10/1995 | C07F 17/00 |
| WO | WO1998/027103 | 6/1998 | C07F 17/00 |
| WO | WO2002/002577 | 1/2002 | C07F 17/00 |
| WO | WO2009/155472 | 12/2009 | C08F 210/02 |
| WO | WO2009/155510 | 12/2009 | C08F 212/08 |
| WO | WO2009/155517 | 12/2009 | C08F 10/06 |
| WO | WO2014/139949 | 9/2014 | C07F 17/00 |
| WO | WO2015/009479 | 1/2015 | C08F 4/6592 |
| WO | WO2018/094088 | 5/2018 | H04J 11/00 |

OTHER PUBLICATIONS

Cherian, A. and Coates, G. W. et al. (2005) "Synthesis of Allyl-Terminated Syndiotactic Polypropylene: Macromonomers for the Synthesis of Branched Polyolefins," Macromolecules, v.38(15), pp. 6259-6268.

Diamond, G. M. et al. (1996) "Efficient Synthesis of Chiral ansa-Metallocenes by Amine Elimination. Synthesis, Structure, and Reactivity of rac-(EBI)Zr(NMe$_2$)$_2$," J. Am. Chem. Soc., v. 118(34), pp. 8024-8033.

Janiak, C. et al. (2006) "Metallocene Catalysts for Olefin Oligomerization" Macromolecular Symposia, v.236(1), pp. 14-22.

Kaneyoshi, H. et al. (2005) "Synthesis of Block and Graft Copolymers with Linear Polyethylene Segments by Combination of Degenerative Transfer Coordination Polymerization and Atom Transfer Radical Polymerization," Macromolecules, v.38(13), pp. 5425-5435.

Kazul'kin, D. et al. (2005) "Zirconium Complexes Involving 2-Phosphorus-Substituted Indenyl Fragments" Organometallics, v.24(12), pp. 3024-3035.

Markel, E. J. et al. (2000) "Metallocene-Based Branch-Block Thermoplastic Elastomers" Macromolecules, v.33(23), pp. 8541-8548.

Morton, J. et al. (2014) "1,1-Olefin-bridged bis-(2-indenyl) metallocenes of titanium and zirconium" Dalton Transactions, v.43(35), pp. 13219-13231.

Moscardi, G. et al. (2001) "Propene Polymerization with the Isospecific, Highly Regioselective rac-Me2C(3-t-Bu-1-Ind)2ZrCl2/MAO Catalyst. 2. Combined DFT/MM Analysis of Chain Propagation and Chain Release Reactions" Organometallics, v.20(10) pp. 1918-1931.

Resconi, L. et al. (2006) "Methylene-Bridged Metallocenes with 2,2prime-Methylenebis[1H-inden-1-yl] Ligands: Synthesis, Characterization, and Polymerization Catalysis of a Synthetically Simple Class of C$_2$- and C$_2$v-Symmetric ansa-Metallocenes" Helvetica Chimica Acta, v.89(8), pp. 1497-1523.

Rose, J. M. et al. (2008) "Poly(ethylene-co-propylene macromonomer)s: Synthesis and Evidence for Starlike Conformations in Dilute Solution," Macromolecules, v.41(03), pp. 559-567.

Rulhoff, S. et al. (2006) "Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules, v.207(16), pp. 1450-1460.

Schaverien, C. et al. (2001) "Ethylene Bis(2-indenyl) Zirconocenes: A New Class of Diastereomeric Metallocenes for the (Co)Polymerization of α-Olefins," Organometallics, v. 20(16), pp. 3436-3452.

Small, B. L. et al. (1999) "Polymerization of Propylene by a New Generation of Iron Catalysts: Mechanisms of Chain Initiation, Propagation, and Termination," Macromolecules, v.32(7), pp. 2120-2130.

Teuben et al. (1990) "Catalytic Olefin Oligomerization and Polymerization with Cationic Group IV Metal Complexes [Cp*$_2$MMe(THT)]$^+$ [Bph$_4$]$^-$, M=Ti, Zr and Hf," Journal Molecular Catalysis, v.62, pp. 277-287.

Wang, C. et al. (2005) "Synthesis, Structural Features, and Formation of Organometallic Derivates of C1-Bridged Cp/Amido Titanium and Zirconium "CpCN-Constrained Geometry" Systems," Organometallics, v.24(20), pp. 4760-4773.

Weng, W. et al. (2000) "Synthesis of Vinyl-Terminated Isotactic Poly(Propylene)," Macromolecular Rapid Comm., v.21(16), pp. 1103-1107.

Yang, X. et al. (1992) "Cationic Metallocene Polymerization Catalysts. Synthesis and Properities of the First Base-Free Zirconocene Hydride," Angew. Chem. Int'l Edition., Engl., v.31, pp. 1375-1377.

Zhu, S. et al. (2002) "Copolymerization of Propylene with Poly(ethylene-co-propylene) Macromonomer and Branch Chain-Length Dependence of Rheological Properties," Macromolecules, v.35(27), lpp. 10062-10070.

Zhu, S. et al. (2003) "Synthesis and Characterization of Long-Chain-Branched Polyolefins with Metallocene Catalysts: Copolymerization of Ethylene with Poly(ethylene-co-propylene) Macromonomer" Macromolecular Rapid Commun., v.24(4), pp. 311-315.

* cited by examiner

ANSA-BIS(INDEN-2-YL) CATALYSTS FOR PRODUCING VINYLIDENE-TERMINATED POLYALPHAOLEFINS

CROSS REFERENCE TO RELATED APPLICATIONS

This application claims the priority benefit of U.S. Provisional Application No. 62/980,809, filed Feb. 24, 2020, the disclosure of which is incorporated herein by reference.

FIELD

The present disclosure relates to production of polyalphaolefins using a transition metal catalyst and an activator.

BACKGROUND

A number of transition complexes have been developed as catalysts for synthesizing polymers and oligomers of olefins. The choice of catalyst may allow tailoring of various polymer/oligomer properties, such as molecular weight, branching, tacticity, crystallinity, melt index, and similar features. Activators such as alumoxanes and non-coordinating anion activators are commonly used as co-catalysts in conjunction with various types of catalytic transition metal complexes.

Alpha olefins are one type of olefin commonly employed in olefin polymerization and oligomerization reactions. The term "alpha olefin" refers to a hydrocarbon having a terminal carbon-carbon double bond with a structure of $RHC=CH_2$, where R can independently be hydrogen or any hydrocarbyl group. Alpha olefins are readily produced commercially in a range of even-numbered carbon counts by oligomerizing ethylene in the presence of a suitable catalyst. Other commercial techniques for producing alpha olefins include byproduct isolation from the Fischer-Tropsch reaction.

Polymers and oligomers of alpha olefins are collectively referred to herein as "polyalphaolefins." Polyalphaolefins, particularly those formed from alpha olefins containing about 6 to about 20 carbon atoms, may be useful synthetic building blocks and intermediates for a variety of commercial and industrial products such as detergents and lubricants. Polyalphaolefins contain a residual carbon-carbon double bond, which may exist as various geometric and structural isomers, including vinyl groups, vinylidene groups, and di- or tri-substituted vinylene groups. The predominant carbon-carbon double bond isomer produced when forming a polyalphaolefin may depend upon both the catalyst employed and the particular alpha olefin undergoing oligomerization. Production of predominantly vinyl-terminated and vinylidene-terminated polyalphaolefins is common, again depending upon catalyst choice. U.S. Pat. No. 8,318,998 and U.S. Patent Application Publication 2013/0023633, for example, disclose the use of metallocene compounds for producing polyalphaolefins having predominantly vinyl termination. U.S. Patent Application Publication 2019/0248936, in contrast, discloses the use of metallocene compounds for producing polyalphaolefins having a high percentage of vinylidene termination. Depending upon the particular olefin isomer formed, a range of reactivity may result when further functionalizing a polyalphaolefin, which may impact their suitably for use in various applications. Vinylidene groups and tri-substituted vinylene groups, for example, are often more reactive than are other types of olefin groups that may be present in polyalphaolefins.

Bis(indenyl) transition metal complexes are one class of metallocene catalyst that may be employed to produce polyalphaolefins in the presence of a suitable activator, such as alumoxanes and non-coordinating borate anions. Representative bis(indenyl) transition metal complexes that may be used effectively to synthesize polyalphaolefins include those described in, for example, U.S. Pat. Nos. 7,169,864; 6,693,156; 6,306,791; 5,145,189; 6,268,518; 6,191,294; 5,243,001; and 6,423,796; and U.S. Patent Publications 2011/0137060 and 2005/0159299. Polyalphaolefin molecular weights and polydispersity indices may often be higher than desired when using metallocene catalysts, such as bis(indenyl) transition metal complexes.

Other references of interest include, but are not necessarily limited to: U.S. application Ser. No. 16/394,166 filed Apr. 25, 2019; Ser. No. 12/642,453 filed Dec. 18, 2009; Ser. No. 12/533,465 filed Jul. 31, 2009; US2010-0038290 filed Aug. 15, 2008; US2018-0282443 filed Mar. 28, 2017; US2018-0282359 filed Mar. 28, 2017; PCT Publication Nos. WO 1995/027717; WO 2009/155471; WO 2009/155472; WO 2009/155510; WO 2009/155517; WO 2017/155149; WO 2012/133717; WO 2017/188602; WO 1998/027103; WO 2018/0094088; WO 2018/182982; WO 2002/002577; U.S. Pat. Nos. 3,367,987; 7,214,745; 8,816,027; 8,669,326; 8,940,839; 8,754,170; 8,426,659; 8,841,397; 8,501,894; 8,669,330; 8,835,563; 8,841,394; 8,399,724; 8,623,974; 8,981,029; 6,403,732; 6,818,585; 7,199,072; 7,087,602; 8,642,497; 6,121,185; 6,420,507; 6,613,713; US Patent Publications 2018/0094088; 2009/0318644, 2004/0102590; 2012/0245313; 2017/0233516; 2015/0203602; 2016/0244535; 2019/0119418; Japanese Publication No. JP 2005-336092; JP 2011-037164A; Chinese Publication No. CN 105622807; EP Publication Nos. EP 0659756; EP 0610851; EP 0283739; Korean Publication No. KR 17250040000; Rulhoff, S. et al. (2006) "Synthesis and Characterization of Defined Branched Poly(propylene)s with Different Microstructures by Copolymerization of Propylene and Linear Ethylene Oligomers ($C_n$=26-28) with Metallocenes/MAO Catalysts," *Macromolecules*, v. 207(16), pp. 1450-1460; Kaneyoshi, H. et al. (2005) "Synthesis of Block and Graft Copolymers with Linear Polyethylene Segments by Combination of Degenerative Transfer Coordination Polymerization and Atom Transfer Radical Polymerization," *Macromolecules*, v. 38(13), pp. 5425-5435; Teuben et al. (1990) *Journal Molecular Catalysis*, v. 62, 1990, pp. 277-287; Yang, X. et al. (1992) *Angew. Chem. Int'l Edition*, Engl., v. 31, pp. 1375-1377; Small, B. L. et al. (1999) *Macromolecules*, v. 32(7), pp. 2120-2130; Weng, W. et al. (2000) *Macromolecular Rapid Comm.*, v. 21(16), pp. 1103-1107; Markel, E. J. et al. (2000) *Macromolecules*, v. 33(23), pp. 8541-8548; Moscardi, G. et al. (2001) *Organometallics*, v. 20(10) pp. 1918-1931; Zhu, S. et al. (2002) *Macromolecules*, v. 35(27), pp. 10062-10070 and (2003) *Macromolecular Rapid Commun.*, v. 24(4), pp. 311-315; Coates, G. W. et al. (2005) *Macromolecules*, v. 38(15), pp. 6259-6268; Rose, J. M. et al. (2008) *Macromolecules*, v. 41(03), pp. 559-567; Janiak, C. et al. (2006) *Macromolecular Symposia*, v. 236(1), pp. 14-22; and CAS numbers 909721-53-5 and 943521-08-2.

Accordingly, there is need for catalysts and methods that may generate high yields polyalphaolefins having relatively low molecular weights and low polydispersity indices, particularly those featuring a high percentage of vinylidene termination when oligomerizing $C_{6+}$ alpha olefins.

SUMMARY

Provided herein are compositions comprising transition metal complexes, which are effective for synthesizing polyalphaolefins. The transition metal complexes comprise a transition metal complex represented by the formula:

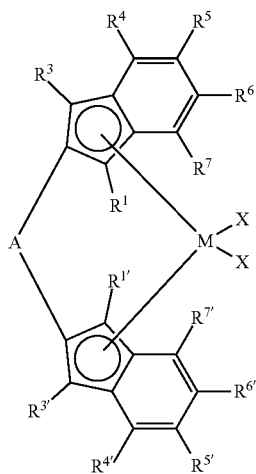

where M is a group 4 transition metal; A is a bridging group having one bridging atom extending between a first indenyl ring and a second indenyl ring; each X is independently an anionic ligand, or two Xs are joined and bound to M to form a metallocycle ring, or two Xs are joined to form a chelating ligand, a diene ligand, or an alkylidene ligand; $R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

Catalysts systems of the present disclosure may comprise an activator and a transition metal complex described by the foregoing or a reaction product thereof.

Polyalphaolefin formation methods disclosed herein comprises contacting a catalyst system with an olefinic feed comprising an alpha olefin under polymerization reaction conditions to obtain a polymerized reaction product comprising at least a vinylidene-terminated polyalphaolefin. The catalyst system comprises an activator and a transition metal complex represented by the formula:

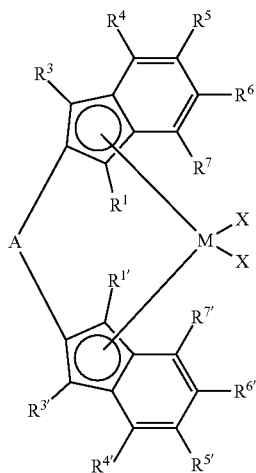

or a reaction product thereof, wherein M is a group 4 transition metal; A is a bridging group having one bridging atom extending between a first indenyl ring and a second indenyl ring; each X is independently an anionic ligand, or two Xs are joined and bound to M to form a metallocycle ring, or two Xs are joined to form a chelating ligand, a diene ligand, or an alkylidene ligand; $R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

DETAILED DESCRIPTION

The present disclosure relates to metallocene catalysts suitable for forming polyalphaolefins (PAOs) and, more particularly, catalytic ansa-bis(inden-2-yl) transition metal complexes and oligomerization methods for generating polyalphaolefins having a low molecular weight and predominantly vinylidene termination.

The ansa-bis(inden-2-yl) transition metal complexes described herein have structural features that surprisingly afford high catalyst activity and low polyalphaolefin molecular weights, particularly when oligomerizing $C_{6+}$ alpha olefins, such as $C_6$-$C_{32}$ alpha olefins. In particular, the ansa-bis(inden-2-yl) transition metal complexes described herein feature a bridging group having one bridging atom extending between the 2-positions of a first indenyl ring and a second indenyl ring, wherein the 2-position and other ring positions specified herein refer to the IUPAC numbering convention for the indene system. In addition, the ansa-bis (inden-2-yl) transition metal complexes described herein are unsubstituted in the 1- and 3-positions of each indenyl ring and, preferably, are also unsubstituted in the 4- and 7-positions of each indenyl ring system. Further, the ansa-bis (inden-2-yl) transition metal complexes described herein are substituted with hydrocarbyl groups or substituted hydrocarbyl groups in the 5- and 6-positions of at least one of the indenyl rings, and preferably upon both indenyl rings. The combination of hydrocarbyl substitution or substituted hydrocarbyl substitution at the 5- and 6-positions and non-substitution at the 1-, 3-, 4-, and 7-positions of the indenyl rings surprisingly affords high catalyst activity when forming low-molecular weight polyalphaolefins with a high-percentage of vinylidene termination and low polydispersity indices, as discussed hereinafter.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 23° C.

As used in the present disclosure and claims, the singular forms "a," "an," and "the" include plural forms unless the context clearly dictates otherwise.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from Groups 3-12 of the Periodic Table, inclusive of the lanthanides and actinide elements. Ti, Zr, and Hf are Group 4 transition metals, for example.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, and Mz) are in units of g/mol (g·mol$^{-1}$). Unless otherwise specified, molecular weight values are determined by $^1$H NMR, as discussed further herein.

For purposes of this disclosure, when a polymer, copolymer, or oligomer, particularly a polyalphaolefin, is referred to as comprising an olefin, the olefin present in such polymer, copolymer, or oligomer is the polymerized form of the olefin. For example, when a copolymer is said to have an "propylene" content of 0 wt % to 5 wt %, it is to be understood that the mer unit in the copolymer is derived from the monomer propylene in the polymerization reaction and said derived units are present at 0 wt % (i.e., absent) to 5 wt %, based upon the weight of the copolymer. As used herein, "polymer" and oligomer" (and grammatical variations thereof) are used interchangeably to refer to a molecule having two or more of the same or different mer units. As used herein, "polymerize" (and grammatical variations thereof, e.g., polymerization, and equivalent thereof such as oligomerize and oligomerization) are used interchangeably to refer to a process of generating a molecule having two or more of the same or different mer units from two or more of the same or different monomers. A "homopolymer" is a polymer (or oligomer) having mer units that are the same. A "copolymer" is a polymer (or oligomer) having two or more mer units that are different from each other. A "terpolymer" is a polymer (or oligomer) having three mer units that are different from each other. "Different," as used to refer to mer units, indicates that the mer units differ from each other by at least one atom or are different isomerically. Accordingly, the definition of copolymer, as used herein, includes terpolymers and like higher polymer. A "decene polymer" or "decene copolymer," for example, is a polymer or copolymer (or oligomer) comprising at least 50 mol % decene-derived units. An oligomer is a polymer having a low molecular weight. In some embodiments, an oligomer has an Mn of 10,000 g/mol or less (e.g., 5000 g/mol or less, or 2,500 g/mol or less); in other embodiments, an oligomer has a low number of mer units (such as 100 mer units or less or 75 mer units or less, or from 2 to 50 mer units).

The term "independently," when referenced to selection of multiple items from within a given group, means that the selected choice for a first item does not necessarily influence the choice of any second or subsequent item. That is, independent selection of multiple items within a given group means that the individual items may be the same or different from one another.

The terms "group," "radical," and "substituent" may be used interchangeably herein.

Reference to a group without specifying a particular isomer thereof (e.g., butyl) expressly discloses all isomers (e.g., n-butyl, iso-butyl, sec-butyl, tert-butyl and cyclobutyl), unless otherwise indicated.

The term "hydrocarbon" refers to a class of compounds having hydrogen bound to carbon, and encompasses saturated hydrocarbon compounds, unsaturated hydrocarbon compounds, and mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. As used herein, acyclic hydrocarbon may be referred to as "carbocyclic," which includes saturated, unsaturated, and partially unsaturated carbocyclic compounds as well as aromatic carbocyclic compounds. The term "heterocyclic" refers to a carbocyclic ring containing at least one ring heteroatom.

The terms "hydrocarbyl radical," "hydrocarbyl group," or "hydrocarbyl" may be used interchangeably and are defined to mean a group consisting of hydrogen and carbon atoms only and bearing at least one unfilled valence position when removed from a parent compound. A hydrocarbyl group can be saturated or unsaturated, linear or branched, cyclic or acyclic, aromatic or non-aromatic. Preferred hydrocarbyls are $C_1$-$C_{100}$ radicals that may be linear or branched. Examples of such radicals include, but are not limited to, alkyl groups such as methyl, ethyl, n-propyl, isopropyl, n-butyl, isobutyl, sec-butyl, tert-butyl, pentyl, iso-amyl (iso-pentyl), hexyl, octyl, cyclopropyl, cyclobutyl, cyclopentyl, cyclohexyl, cyclooctyl, and the like. The term "hydrocarbyl group having 1 to about 100 carbon atoms" refers to a moiety selected from a linear, cyclic or branched $C_1$-$C_{100}$ hydrocarbyl group.

The term "optionally substituted" means that a group may be unsubstituted or substituted. For example, the term "optionally substituted hydrocarbyl" refers to replacement of at least one hydrogen atom or carbon atom in a hydrocarbyl group with a heteroatom or heteroatom functional group.

The terms "substituted hydrocarbon" or "substituted hydrocarbyl" means that a hydrocarbon or hydrocarbyl group may be unsubstituted or substituted.

Substituted hydrocarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Silylcarbyl radicals (also referred to as silylcarbyls, silylcarbyl groups, or silylcarbyl substituents) are radicals in which one or more hydrocarbyl hydrogen atoms have been substituted with at least one SiR*$_3$ containing group or where at least one —Si(R*)$_2$— has been inserted within the hydrocarbyl radical or substituted for carbon within the hydrocarbyl radical, where R* is independently a hydrocarbyl or halocarbyl radical, and two or more R* may join together to form a substituted or unsubstituted saturated, partially unsaturated or aromatic cyclic or polycyclic ring structure. Silylcarbyl radicals may be bonded via a silicon atom or a carbon atom.

Substituted silylcarbyl radicals are silylcarbyl radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, provided that at least one halogen atom remains on the original halocarbyl radical. Additionally, two or more R* may join together to form a substituted or unsubstituted saturated, partially unsaturated or aromatic cyclic or polycyclic ring structure.

Germylcarbyl radicals (also referred to as germylcarbyls, germylcarbyl groups or germylcarbyl substituents) are radicals in which one or more hydrocarbyl hydrogen atoms have been substituted with at least one $GeR*_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Germylcarbyl radicals may be bonded via a germanium atom or a carbon atom.

Substituted germylcarbyl radicals are germylcarbyl radicals in which at least one hydrogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $SnR*_3$, $PbR_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The terms "linear" or "linear hydrocarbon" refer to a hydrocarbon or hydrocarbyl group having a continuous carbon chain without side chain branching.

The terms "branched" or "branched hydrocarbon" refer to a hydrocarbon or hydrocarbyl group having a linear carbon chain or a carbocyclic ring, in which a hydrocarbyl side chain extends from the linear carbon chain or the carbocyclic ring.

The terms "saturated" or "saturated hydrocarbon" refer to a hydrocarbon or hydrocarbyl group in which all carbon atoms are bonded to four other atoms, with the exception of an unfilled valence position being present upon carbon in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The term "alkyl" refers to a hydrocarbyl group having no unsaturated carbon-carbon bonds, and which may be optionally substituted. An alkyl group can be linear, branched, cyclic, or a combination thereof.

The terms "cycloalkyl" or "cycloalkyl group" interchangeably refer to a saturated hydrocarbyl group wherein the carbon atoms form one or more ring structures. The terms "cycloalkenyl" or "cycloalkenyl group" interchangeably refer to a cyclic hydrocarbyl group comprising a carbon-carbon double bond in the ring.

The terms "alkene" and "olefin" are used synonymously herein. Similarly, the terms "alkenic" and "olefinic" are used synonymously herein. Unless otherwise noted, all possible geometric isomers are encompassed by these terms. The term "alkenyl" refers to a hydrocarbyl group having a carbon-carbon double bond.

The carbon-carbon double bond in an alkene may be in various structural or geometric isomer forms, which may include vinylidenes, vinyls, disubstituted vinylenes and tri-substituted vinylenes.

The term "vinyl" refers to an olefin represented by the following formula:

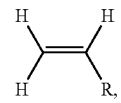

wherein R is a hydrocarbyl group, preferably a saturated hydrocarbyl group such as an alkyl group.

The term "vinylidene" refers to an olefin represented by the following formula:

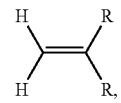

wherein each R is an independently selected hydrocarbyl group, preferably a saturated hydrocarbyl group such as alkyl group. Vinylidenes are 1,1-disubstituted vinylene groups.

The term "disubstituted vinylene" or simply "vinylene" refers to (i) an olefin represented by the following formula:

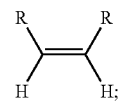

(ii) an olefin represented by the following formula:

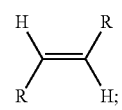

(iii) a mixture thereof in any proportion,
wherein each R is an independently selected hydrocarbyl group, preferably a saturated hydrocarbyl group such as alkyl group. The term "disubstituted vinylene" is not inclusive of the term "vinylidene." That is, di-substituted vinylenes represent only 1,2-di-substituted vinylene groups and do not include vinylidene groups.

The term "tri-substituted vinylene" refers to an olefin represented by the following formula:

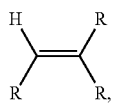

wherein each R is an independently selected hydrocarbyl group, preferably a saturated hydrocarbyl group such as alkyl group. Such tri-substituted vinylenes may be alternatively referred to herein as "trisubstituted" or "trisubs." Alternatively, two R groups on adjacent carbon atoms may together form a non-aromatic ring structure, with a third R group remaining as a pendant hydrocarbyl group.

The term "alpha olefin" refers to an olefin having a terminal carbon-carbon double bond in the structure thereof (R"HC=CH$_2$, where R" is hydrogen or a hydrocarbyl group; preferably R" is an alkyl group). Non-limiting examples of alpha olefins include, for instance, ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Any of these alpha olefins may be used to form polyalphaolefins in the disclosure herein.

In the present disclosure, ethylene shall be considered an alpha olefin.

The terms "aromatic," "aromatic group," or "aromatic hydrocarbon" refer to a hydrocarbon or hydrocarbyl group having a cyclic arrangement of delocalized, conjugated pi-electrons that satisfies the Hückel rule. The terms "heteroaryl," "heteroaryl group," or "heteroaromatic" refer to an aromatic ring containing a heteroatom and which satisfies the Hückel rule, such as an aryl group where a ring carbon atom (or two or three ring carbon atoms) has/have been replaced with a heteroatom, such as N, O, or S.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms. As used herein, the term "aromatic" also refers to pseudoaromatic heterocycles, which are heterocyclic compounds having similar properties and structures (nearly planar) to aromatic heterocyclic ligands, but are not by definition aromatic. Examples of aryl groups include phenyl and naphthyl.

Examples of saturated hydrocarbyl groups include, but are not limited to, alkyl groups such as methyl, ethyl, n-propyl, isopropyl, n-butyl, isobutyl, sec-butyl, tert-butyl, pentyl, iso-amyl (isopentyl), neopentyl, hexyl, octyl, cyclopropyl, cyclobutyl, cyclopentyl, cyclohexyl, cyclooctyl, and the like. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like.

The term "catalyst system" refers to the combination of a transition metal complex and at least one activator, or an activated reaction product form thereof. When used to describe such a combination before activation, the term "catalyst system" refers to the unactivated transition metal complex (precatalyst) together with the at least one activator (co-catalyst). When used to describe such a combination after activation, the term "catalyst system" refers to the activated complex and the at least one activator or other charge-balancing moiety. The transition metal complex may be neutral as in a precatalyst, or a charged species with a counter ion as in an activated catalyst system. For the purposes of this disclosure and the claims associated therewith, when catalyst systems are described as comprising neutral stable forms of the components, it is well understood by one of ordinary skill in the art that the ionic form of the component is the form that reacts with one or more monomers to produce an oligomer. A polymerization catalyst system is a catalyst system that can polymerize one or more monomers to form a polymer (or an oligomer) containing the one or more monomers.

A scavenger is a compound typically added to a polymerization reaction to facilitate the reaction by scavenging impurities. Some scavengers may also act as activators and may be referred to as co-activators. A co-activator, that is not a scavenger, may be used in conjunction with an activator in order to form an activated catalyst. In some embodiments, a co-activator can be pre-mixed with a catalyst compound to form an alkylated catalyst compound.

A "solution polymerization" refers to a polymerization process in which the polymerization is conducted in a liquid polymerization medium, such as an inert solvent or monomer(s) or their blends. A solution polymerization is typically homogeneous. A homogeneous polymerization is one where the polymer product and catalyst are each dissolved in the polymerization medium. Such systems are typically not turbid, as described in Oliveira, J. V. et al. (2000) "High-Pressure Phase Equilibria for Polypropylene-Hydrocarbon Systems," *Ind. Eng. Chem. Res.*, v. 39(12), pp. 4627-4633.

A bulk polymerization refers to a polymerization process in which the monomers and/or comonomers being polymerized are used as a solvent or diluent using little or no inert solvent or diluent. A small fraction of inert solvent may be used as a carrier for catalyst and scavenger, if desired. A bulk polymerization system contains less than about 25 wt % of inert solvent or diluent, such as less than about 10 wt %, or less than about 1 wt %, including 0 wt %.

Accordingly, the present disclosure describes transition metal complexes and catalyst systems comprising transition metal complexes represented by Formula (1) below.

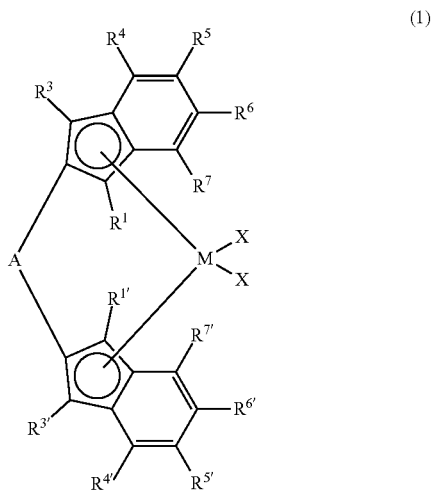

(1)

In Formula (1), M is a group 4 transition metal and A is a bridging group having one bridging atom between a first indenyl ring and a second indenyl ring. Each X is independently an anionic ligand, or two Xs are joined and bound to M to form a metallocycle ring, or two Xs are joined to form a chelating ligand, a diene ligand, or an alkylidene ligand. $R^1$, $R^{1'}$, $R^3$, $R^{3'}$, $R^4$, $R^{4'}$, $R^7$ and $R^{7'}$ are hydrogen. $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

Catalyst systems suitable for generating vinylidene-terminated PAOs comprise an activator and at least one of the foregoing transition metal complexes, wherein the activator promotes formation of a reactive species (activated catalyst or activated transition metal complex) effective for promoting olefin oligomerization to form a polyalphaolefin. As discussed in more detail hereinafter, suitable activators may include, but are not limited to, alkyl aluminum compounds, alumoxanes, boranes, or borates, with some examples of the latter compounds being non-coordinating anion activators. Activators such as alumoxanes and non-coordinating borate anions may be preferred.

In the transition metal complexes of the present disclosure, suitable Group 4 transition metals M may include any Group 4 transition metal, preferably hafnium (Hf) or zirconium (Zr). More preferably, M is zirconium.

Bridging group A has one bridging atom extending between a first indenyl ring and a second indenyl ring. Additional atoms may be present in bridging group A, but do not directly connect (extend between) the first indenyl ring and the second indenyl ring. Suitable examples of bridging groups A that may be present in the transition metal complexes of the present disclosure include, but are not limited to, S, O, PR', NR', SiR"$_2$, GeR"$_2$, CH$_2$, CHR", and CR"$_2$. R' is a $C_1$-$C_{30}$, optionally substituted, hydrocarbyl group. R" is hydrogen or a $C_1$-$C_{30}$, optionally substituted, hydrocarbyl group, preferably a $C_1$-$C_{30}$, optionally substituted, hydrocarbyl group. Preferably, A is selected from the group consisting of S, O, PR', NR', SiR"$_2$, GeR"$_2$, and CR"$_2$, wherein R' and R" are defined as above. More preferably, A is selected from the group consisting of S, O, PR', NR', and SiR"$_2$, wherein R' is a $C_1$-$C_{30}$, optionally substituted, hydrocarbyl group, and R" is hydrogen or a $C_1$-$C_{30}$, optionally substituted, hydrocarbyl group.

In one or more preferred embodiments, A is O or S. More preferably, A is S.

In one or more preferred embodiments, A is PR' or NR', wherein R' is a $C_1$-$C_{30}$, optionally substituted, hydrocarbyl group. More preferably, A is NR', wherein R' is a $C_1$-$C_{30}$, optionally substituted, hydrocarbyl group.

Referring still to Formula (1), each X may be independently selected from the group consisting of a $C_1$-$C_{20}$ hydrocarbyl group, a hydride, an alkoxide, a sulfide, a phosphide, a halide, a diene, an amine, a phosphine, an ether, and any combination thereof. Optionally, two Xs comprising any of the foregoing may be joined and bound to M to form a metallocycle ring, or two Xs comprising any of the foregoing may be joined to form a chelating ligand, a diene ligand, or an alkylidene ligand. Preferably, each X may be an independently selected alkyl group. More preferably, the alkyl group may be independently selected from the group consisting of methyl, ethyl, propyl, butyl, and pentyl. Further preferably, each X may be an independently selected halide. More preferably, the halide may be independently selected from the group consisting of fluoro, chloro, and bromo. Still further preferably, each X may be an independently selected amide, such as dimethylamide or diethylamide.

As mentioned above, the transition metal complexes of the present disclosure may catalyze polymerization of an alpha olefin to afford polyalphaolefins having desirably low molecular weights while still maintaining high catalyst activity values. To accomplish the foregoing, $R^1$, $R^{1'}$, $R^3$, and $R^{3'}$ are hydrogen in Formula 1, and $R^4$ and $R^{4'}$ and/or $R^7$ and $R^{7'}$ may be hydrogen. Preferably, $R^1$, $R^{1'}$, $R^3$, $R^{3'}$, $R^4$, $R^{4'}$, $R^7$ and $R^{7'}$ are all hydrogen.

Low polyalphaolefin molecular weights and high catalyst activity values may be further promoted by hydrocarbyl substitution at $R^5$, $R^{5'}$, $R^6$, and $R^{6'}$, particularly a $C_1$-$C_{10}$, optionally substituted, alkyl group, or $R^5$ and $R^6$ and/or $R^{5'}$ and $R^{6'}$ may be a $C_1$-$C_4$ hydrocarbyl group bonded together to form a ring structure, which may be saturated, partially unsaturated or unsaturated. Preferably, $R^5$, $R^{5'}$, $R^6$, and $R^{6'}$ may comprise an alkyl group independently selected from the group consisting of methyl, ethyl, propyl, butyl, pentyl, hexyl, heptyl, octyl, nonyl and decyl, and isomers thereof. More preferably, $R^5$, $R^{5'}$, $R^6$, and $R^{6'}$ may comprise an alkyl group selected from methyl and ethyl. When $R^5$ and $R^6$ and/or $R^{5'}$ and $R^{6'}$ are joined to form a ring structure, preferable ring structures are from four-membered to eight-membered rings, preferably five-membered or six-membered rings. In embodiments of the invention, when $R^5$ and $R^6$ and/or $R^{5'}$ and $R^{6'}$ are joined to form a ring structure, the ring structure is not aromatic, preferably is not a six membered aromatic ring. In embodiments of the invention, when $R^5$ and $R^6$ and/or $R^{5'}$ and $R^{6'}$ are joined to form a ring structure, the ring structure is not saturated, preferably is not a five membered saturated ring.

In embodiments of the invention, when $R^5$ and $R^6$ and/or $R^{5'}$ and $R^{6'}$ are joined to form a ring structure, the ring structure is not a six membered ring.

In embodiments of the invention, when $R^5$ and $R^6$ and/or $R^{5'}$ and $R^{6'}$ are joined to form a ring structure, the ring structure is not a five membered ring.

In a preferred embodiment of the invention, A is S, O, PR', NR', and SiR"$_2$, wherein R' is a $C_1$-$C_{30}$, optionally substituted, hydrocarbyl group, and R" is hydrogen or a $C_1$-$C_{30}$, optionally substituted, hydrocarbyl group; and $R^5$, $R^{5'}$, $R^6$, and $R^{6'}$ are independently selected from the group consisting of methyl, ethyl, propyl, butyl, pentyl, hexyl, heptyl, octyl, nonyl and decyl, and isomers thereof.

In a preferred embodiment of the invention, A is S and $R^5$, $R^{5'}$, $R^6$, and $R^{6'}$ are independently selected from the group consisting of methyl, ethyl, propyl, butyl, pentyl, hexyl, heptyl, octyl, nonyl and decyl, and isomers thereof.

Metallocene compounds that are particularly useful in the present disclosure include one or more of:

2,2'-(sulfanediyl)bis($\eta^5$-5,6-dimethyl-1H-inden-2-yl)zirconium dichloride, 2,2'-(oxy)bis($\eta^5$-5,6-dimethyl-1H-inden-2-yl)zirconium dichloride, 2,2'-(phenylphosphanediyl)bis($\eta^5$-5,6-dimethyl-1H-inden-2-yl)zirconium dichloride, 2,2'-(phenylaminediyl)bis($\eta^5$-5,6-dimethyl-1H-inden-2-yl)zirconium dichloride, 2,2'-(methylene)bis($\eta^5$-5,6-dimethyl-1H-inden-2-yl)zirconium dichloride, 2,2'-(isopropylene)bis($\eta^5$-5,6-dimethyl-1H-inden-2-yl)zirconium dichloride, 2,2'-(dimethylsilylene)bis($\eta^5$-5,6-dimethyl-1H-inden-2-yl)zirconium dichloride, 2,2'-(dimethylgermylene)bis($\eta^5$-5,6-dimethyl-1H-inden-2-yl)zirconium dichloride,
2,2'-(sulfanediyl)bis($\eta^5$-5,6-dimethyl-1H-inden-2-yl)hafnium dichloride,
2,2'-(oxy)bis($\eta^5$-5,6-dimethyl-1H-inden-2-yl)hafnium dichloride,
2,2'-(phenylphosphanediyl)bis($\eta^5$-5,6-dimethyl-1H-inden-2-yl)halfnium dichloride,
2,2'-(phenylaminediyl)bis($\eta^5$-5,6-dimethyl-1H-inden-2-yl)hafnium dichloride,
2,2'-(methylene)bis($\eta^5$-5,6-dimethyl-1H-inden-2-yl)hafnium dichloride,
2,2'-(isopropylene)bis($\eta^5$-5,6-dimethyl-1H-inden-2-yl)hafnium dichloride,
2,2'-(dimethylsilylene)bis($\eta^5$-5,6-dimethyl-1H-inden-2-yl)halfnium dichloride,
2,2'-(dimethylgermylene)bis($\eta^5$-5,6-dimethyl-1H-inden-2-yl)hafnium dichloride,
2,2'-(sulfanediyl)bis($\eta^5$-5,6-dimethyl-1H-inden-2-yl)titanium dichloride,
2,2'-(sulfanediyl)bis($\eta^5$-5,6-dimethyl-1H-inden-2-yl)titanium dimethyl,
2,2'-(sulfanediyl)bis($\eta^5$-5,6-dimethyl-1H-inden-2-yl)zirconium dimethyl,
2,2'-(oxy)bis($\eta^5$-5,6-dimethyl-1H-inden-2-yl)zirconium dimethyl,
2,2'-(phenylphosphanediyl)bis($\eta^5$-5,6-dimethyl-1H-inden-2-yl)zirconium dimethyl,
2,2'-(phenylaminediyl)bis($\eta^5$-5,6-dimethyl-1H-inden-2-yl)zirconium dimethyl,
2,2'-(methylene)bis($\eta^5$-5,6-dimethyl-1H-inden-2-yl)zirconium dimethyl,
2,2'-(isopropylene)bis($\eta^5$-5,6-dimethyl-1H-inden-2-yl)zirconium dimethyl,
2,2'-(dimethylsilylene)bis($\eta^5$-5,6-dimethyl-1H-inden-2-yl)zirconium dimethyl,
2,2'-(dimethylgermylene)bis($\eta^5$-5,6-dimethyl-1H-inden-2-yl)zirconium dimethyl,
2,2'-(sulfanediyl)bis($\eta^5$-5,6-dimethyl-1H-inden-2-yl)hafnium dimethyl,
2,2'-(oxy)bis($\eta^5$-5,6-dimethyl-1H-inden-2-yl)hafnium dimethyl,
2,2'-(phenylphosphanediyl)bis($\eta^5$-5,6-dimethyl-1H-inden-2-yl)halfnium dimethyl,
2,2'-(phenylaminediyl)bis($\eta^5$-5,6-dimethyl-1H-inden-2-yl)hafnium dimethyl,
2,2'-(methylene)bis($\eta^5$-5,6-dimethyl-1H-inden-2-yl)hafnium dimethyl,
2,2'-(isopropylene)bis($\eta^5$-5,6-dimethyl-1H-inden-2-yl)hafnium dimethyl,
2,2'-(dimethylsilylene)bis($\eta^5$-5,6-dimethyl-1H-inden-2-yl)halfnium dimethyl,
2,2'-(dimethylgermylene)bis($\eta^5$-5,6-dimethyl-1H-inden-2-yl)hafnium dimethyl,
2,2'-(sulfanediyl)bis($\eta^5$-5,6-diethyl-1H-inden-2-yl)zirconium dichloride,
2,2'-(sulfanediyl)bis($\eta^5$-5,6-diethyl-1H-inden-2-yl)hafnium dichloride,
2,2'-(sulfanediyl)bis($\eta^5$-5,6-dipropyl-1H-inden-2-yl)zirconium dichloride,
2,2'-(sulfanediyl)bis($\eta^5$-5,6-dipropyl-1H-inden-2-yl)hafnium dichloride,
2,2'-(sulfanediyl)bis($\eta^5$-5,6-dibutyl-1H-inden-2-yl)zirconium dichloride,
2,2'-(sulfanediyl)bis($\eta^5$-5,6-dibutyl-1H-inden-2-yl)hafnium dichloride,
2,2'-(sulfanediyl)bis(1,5,6,7-tetrahydro-s-indacen-2-yl)zirconium dichloride,
2,2'-(sulfanediyl)bis(1,5,6,7-tetrahydro-s-indacen-2-yl)hafnium dichloride,
2,2'-(sulfanediyl)bis(5,6,7,8-tetrahydro-1H-cyclopenta[b]naphthalene-2-yl)zirconium dichloride,
2,2'-(sulfanediyl)bis(5,6,7,8-tetrahydro-1H-cyclopenta[b]naphthalene-2-yl)hafnium dichloride,
2,2'-(sulfanediyl)bis($\eta^5$-5,6-diethyl-1H-inden-2-yl)zirconium dimethyl,
2,2'-(sulfanediyl)bis($\eta^5$-5,6-diethyl-1H-inden-2-yl)hafnium dimethyl,
2,2'-(sulfanediyl)bis($\eta^5$-5,6-dipropyl-1H-inden-2-yl)zirconium dimethyl,
2,2'-(sulfanediyl)bis($\eta^5$-5,6-dipropyl-1H-inden-2-yl)hafnium dimethyl,
2,2'-(sulfanediyl)bis($\eta^5$-5,6-dibutyl-1H-inden-2-yl)zirconium dimethyl,
2,2'-(sulfanediyl)bis($\eta^5$-5,6-dibutyl-1H-inden-2-yl)hafnium dimethyl,
2,2'-(sulfanediyl)bis(1,5,6,7-tetrahydro-s-indacen-2-yl)zirconium dimethyl,
2,2'-(sulfanediyl)bis(1,5,6,7-tetrahydro-s-indacen-2-yl)hafnium dimethyl,
2,2'-(sulfanediyl)bis(5,6,7,8-tetrahydro-1H-cyclopenta[b]naphthalene-2-yl)zirconium dimethyl,
2,2'-(sulfanediyl)bis(5,6,7,8-tetrahydro-1H-cyclopenta[b]naphthalene-2-yl)hafnium dimethyl,
and the like.

Preferred metallocene compounds for use in the present disclosure may include one or more of:
2,2'-(sulfanediyl)bis($\eta^5$-5,6-dimethyl-1H-inden-2-yl)zirconium dichloride,
2,2'-(sulfanediyl)bis($\eta^5$-5,6-dimethyl-1H-inden-2-yl)hafnium dichloride,
2,2'-(sulfanediyl)bis($\eta^5$-5,6-dimethyl-1H-inden-2-yl)zirconium dimethyl,
2,2'-(sulfanediyl)bis($\eta^5$-5,6-dimethyl-1H-inden-2-yl)hafnium dimethyl,
2,2'-(sulfanediyl)bis($\eta^5$-5,6-diethyl-1H-inden-2-yl)zirconium dichloride,
2,2'-(sulfanediyl)bis($\eta^5$-5,6-diethyl-1H-inden-2-yl)hafnium dichloride,
2,2'-(sulfanediyl)bis(1,5,6,7-tetrahydro-s-indacen-2-yl)zirconium dichloride,
2,2'-(sulfanediyl)bis(1,5,6,7-tetrahydro-s-indacen-2-yl)hafnium dichloride,
2,2'-(sulfanediyl)bis(5,6,7,8-tetrahydro-1H-cyclopenta[b]naphthalene-2-yl)zirconium dichloride,
2,2'-(sulfanediyl)bis(5,6,7,8-tetrahydro-1H-cyclopenta[b]naphthalene-2-yl)hafnium dichloride,
2,2'-(sulfanediyl)bis($\eta^5$-5,6-diethyl-1H-inden-2-yl)zirconium dimethyl,
2,2'-(sulfanediyl)bis($\eta^5$-5,6-diethyl-1H-inden-2-yl)hafnium dimethyl,
2,2'-(sulfanediyl)bis(1,5,6,7-tetrahydro-s-indacen-2-yl)zirconium dimethyl,
2,2'-(sulfanediyl)bis(1,5,6,7-tetrahydro-s-indacen-2-yl)hafnium dimethyl,
2,2'-(sulfanediyl)bis(5,6,7,8-tetrahydro-1H-cyclopenta[b]naphthalene-2-yl)zirconium dimethyl,
2,2'-(sulfanediyl)bis(5,6,7,8-tetrahydro-1H-cyclopenta[b]naphthalene-2-yl)zirconium dimethyl, and the like.

The present disclosure also provides catalyst systems comprising at least one of the transition metal complexes described hereinabove. More specifically, the catalyst systems of the present disclosure comprise an activator and a transition metal complex represented by Formula (1), or a reaction product thereof, wherein the variables in Formula (1) are specified in more detail above. In this instance, the term "reaction product" refers to an activated form of the transition metal complex that is effective for promoting olefin polymerization or oligomerization. Without being bound by any theory or mechanism, the activator may react with the transition metal complex to promote loss of an anionic ligand (i.e., at least one X) to open a coordination site, at which polymerization of an olefin may occur.

The typical activator-to-complex molar ratio may be from about 0.1:1 to about 100:1, alternately from about 0.5:1 to about 200:1, alternately from about 1:1 to about 500:1, or alternately from about 1:1 to about 1000:1. A particularly useful molar ratio range may be from about 0.5:1 to about 10:1, preferably from about 1:1 to about 5:1, and more preferably about 1:1.

In any embodiment of the present disclosure, suitable activators for the transition complexes may comprise an alumoxane. Suitable alumoxanes are not considered especially limited, provided they allow a polymer or oligomer to form upon contacting a polymerizable monomer, such as one or more alpha olefins, as described herein. Methylalumoxane (MAO) may be an especially suitable alumoxane for use in combination with the transition metal complexes disclosed herein.

When the activator is an alumoxane, the molar ratio of alumoxane to transition metal complex (per metal catalytic site) (Al:M) may be from about 1:1 to about 1000:1, or from about 1:1 to about 500:1, or from about 1:1 to about 200:1 (Al:M), or from about 1:1 to about 100:1 (Al:M), or from about 1:1 to about 50:1 (Al:M).

Other suitable activators for the transition metal complexes may include compounds containing a non-coordinating anion, especially borane and borate compounds. Particularly useful borane and borate compounds containing a non-coordinating anion or similar entity include, for example, $B(C_6F_5)_3$, $[PhNMe_2H]^+[B(C_6F_5)_4]^-$, $[Ph_3C]^+[B(C_6F_5)_4]^-$, and $[PhNMe_2H]^+[B(C_{10}F_7)_4]^-$.

A non-coordinating anion (NCA) is defined to mean an anion either that does not coordinate to a transition metal center or that does coordinate to a transition metal center, but only weakly. The term NCA is defined to include multicomponent NCA-containing activators, such as N,N-dimethylanilinium tetrakis(pentafluorophenyl)borate and N,N-dimethylanilinium tetrakis(heptafluoronaphthyl)borate, that contain an acidic cationic group and the non-coordinating anion. The term NCA is also defined to include neutral Lewis acids, such as tris(pentafluorophenyl)boron, that can react with a transition metal complex to form an activated species by abstraction of an anionic group. Typically, NCAs coordinate weakly enough that a neutral Lewis base, such as an olefinically or acetylenically unsaturated monomer, can displace the NCA from the transition metal center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

"Compatible" non-coordinating anions are those that are not degraded to neutrality when the initially formed complex decomposes. Further, the anion does not transfer an anionic substituent or fragment to the cation to cause it to form a neutral transition metal compound and a neutral byproduct from the anion. Non-coordinating anions useful in accordance with this disclosure include those that are compatible, stabilize the transition metal cation in the sense of balancing its ionic charge at +1, and yet retain sufficient lability to permit displacement during polymerization.

It is within the scope of this disclosure to use an ionizing, neutral, or ionic activator, such as tri(n-butyl)ammonium tetrakis(pentafluorophenyl)borate, a tris perfluorophenylboron metalloid precursor or a trisperfluoronaphthylboron metalloid precursor, polyhalogenated heteroborane anions (WO 1998/043983), boric acid (U.S. Pat. No. 5,942,459), or any combination thereof. It is also within the scope of this disclosure to use neutral or ionic activators alone or in combination with alumoxane activators.

The catalyst systems of the present disclosure may include at least one non-coordinating anion (NCA) activator. Preferably, NCA activators represented by Formula (2) below may be used,

$$Z_d^+(A^{d-}) \qquad (2)$$

where Z is (L-H) or a reducible Lewis acid; L is a neutral Lewis base; H is hydrogen; (L-H) is a Bronsted acid; $A^{d-}$ is a non-coordinating anion having the charge $d^-$; and d is 1, 2, or 3.

The cation component $Z_d^+$ may include Bronsted acids such as protons or protonated Lewis bases or reducible Lewis acids capable of protonating or abstracting a moiety from the transition metal complexes to result in a cationic transition metal species.

The cation component $Z_d^+$ may also be a moiety such as silver, tropylium, carboniums, ferroceniums and mixtures thereof, preferably carboniums and ferroceniums. Suitable reducible Lewis acids include any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl). Preferably, the reducible Lewis acids in Formula (2) defined as "Z" include those represented by the formula: $(Ph_3C)$, where Ph is a substituted or unsubstituted phenyl, preferably substituted with $C_1$ to $C_{40}$ hydrocarbyls, or substituted $C_1$ to $C_{40}$ hydrocarbyls, preferably $C_1$ to $C_{20}$ alkyls or aromatics or substituted $C_1$ to $C_{20}$ alkyls or aromatics, and preferably $Z_d^+$ is triphenylcarbonium.

When $Z_d^+$ is the activating cation $(L-H)_d^+$, it is preferably a Bronsted acid, capable of donating a proton to the transition metal complex to result in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}G]^{d-}$ wherein k is 1, 2, or 3; g is 1, 2, 3, 4, 5, or 6 (preferably 1, 2, 3, or 4); g−k=d; M is an element selected from Group 13 of the Periodic Table of the Elements, preferably boron or aluminum, and G is independently a hydride, bridged or unbridged dialkylamido, halide, alkoxide, aryloxide, hydrocarbyl, substituted hydrocarbyl, halocarbyl, substituted halocarbyl, and halo-substituted hydrocarbyl radicals, said G having up to 40 carbon atoms with the proviso that in not more than 1 occurrence is G a halide. Preferably, each G is a fluorinated hydrocarbyl group having 1 to 40 carbon atoms, more preferably, each G is a fluorinated aryl group, and most preferably, each G is a perfluorinated aryl group, such as a pentafluorophenyl or perfluoronaphthyl group. Examples of suitable $A^{d-}$ also include diboron compounds as disclosed in U.S. Pat. No. 5,447,895, which is fully incorporated herein by reference with respect to the diboron compounds disclosed therein.

Preferably, NCA activators represented by Formula (3) may be used in the disclosure herein,

$$[R^{1'}R^{2'}R^{3'}EH]^{d+}[Mt^{k+}Q_n]^{d-} \quad (3)$$

wherein, in Formula (3), E is nitrogen or phosphorus; d is 1, 2, or 3; k is 1, 2, or 3; n is 1, 2, 3, 4, 5, or 6; n−k=d (preferably d is 1, 2, or 3; k is 3; and n is 4, 5, or 6); $R^{1'}$, $R^{2'}$, and $R^{3'}$ are independently selected $C_1$-$C_{30}$, optionally substituted, hydrocarbyl groups; Mt is an element from group 13 of the Periodic Table, such as boron or phosphorus; and each Q is independently selected from a hydride, a bridged or unbridged dialkylamido, a halide, an alkoxide, an aryloxide, an optionally substituted hydrocarbyl group, an optionally substituted halocarbyl group, or the like. Preferably, each Q is a halosubstituted hydrocarbyl group. Preferably, $R^{1'}$, $R^{2'}$, and $R^{3'}$ collectively comprise 15 or more carbon atoms. More preferably, $R^{1'}$ is a methyl group, and $R^{2'}$ and $R^{3'}$ collectively comprise 14 or more carbon atoms. Still more preferably, suitable NCA activators may be represented by Formula (4),

$$[R^{1'}R^{2'}R^{3'}EH]^+[BR^{4'}R^{5'}R^{6'}R^{7'}] \quad (4)$$

wherein, in Formula (4), E is nitrogen or phosphorus, preferably nitrogen; $R^{1'}$ is a methyl group; $R^{2'}$ and $R^{3'}$ are independently selected $C_4$-$C_{50}$, optionally substituted, hydrocarbyl groups that collectively comprise 14 or more carbon atoms; B is boron; and $R^{4'}$, $R^{5'}$, $R^{6'}$ and $R^{7'}$ are independently hydride, a bridged or unbridged dialkylamido group, a halide, an alkoxide, an aryloxide, a hydrocarbyl, or a halocarbyl. Preferably, $R^{4'}$, $R^{5'}$, $R^{6'}$ and $R^{7'}$ are each a halosubstituted hydrocarbyl group. More preferably, $R^{4'}$, $R^{5'}$, $R^{6'}$ and $R^{7'}$ are perfluorophenyl or perfluoronaphthyl. Optionally, at least one of $R^{4'}$, $R^{5'}$, $R^{6'}$ and $R^{7'}$ is not perfluorophenyl or perfluoronaphthyl.

Illustrative but not limiting examples of boron compounds which may be used as an activator are the compounds described as (and particularly those specifically listed as) activators in U.S. Pat. No. 8,658,556, which is incorporated by reference herein with respect to the boron compounds disclosed therein.

Preferably, the activator is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate. In any embodiment, the non-coordinating anion may be selected from N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl) pyrrolidinium; [Me$_3$NH$^+$][B(C$_6$F$_5$)$_4^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium. Preferably, the non-coordinating anion may be N,N-dimethylanilinium tetrakis(perfluoronaphthyl)borate or N,N-dimethylanilinium tetrakis(perfluorophenyl)borate.

Bulky activators are also useful herein as NCAs. "Bulky activator" as used herein refers to anionic activators represented by Formulas (5) or (6) below.

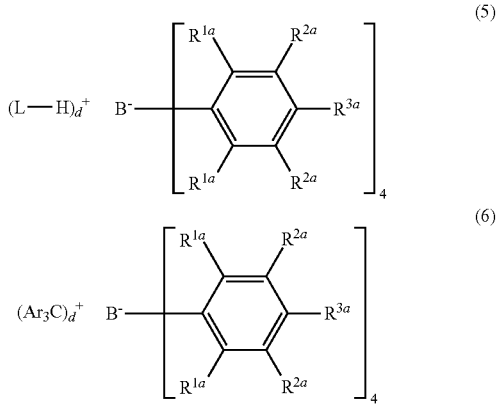

In Formulas (5) and (6), each $R^{1a}$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R^{2a}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{2a}$ is a fluoride or a perfluorinated phenyl group); each $R^{3a}$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{3a}$ is a fluoride or a $C_6$ perfluorinated aromatic hydrocarbyl group); wherein $R^{2a}$ and $R^{3a}$ can form one or more saturated or unsaturated, substituted or unsubstituted rings (preferably $R^{2a}$ and $R^{3a}$ form a perfluorinated phenyl ring); and L is a neutral Lewis base; (L-H)$^+$ is a Bronsted acid; d is 1, 2, or 3; wherein the anion has a molecular weight of greater than 1020 g/mol; wherein at least three of the substituents on the B atom each have a molecular volume of greater than 250 cubic Å, greater than 300 cubic Å, or greater than 500 cubic Å, as specified below.

Preferably, (Ar$_3$C)$_d^+$ is (Ph$_3$C)$_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume. Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following listing of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful bulky activators, U.S. Pat. No. 8,658,556, which is incorporated by reference herein with respect to its disclosure of bulky activators, may be consulted.

In any embodiment, a NCA activator may be an activator as described in U.S. Pat. No. 6,211,105. The NCA activator-to-complex ratio may be from about a 1:1 molar ratio to about a 1000:1 molar ratio, which includes, from about 0.1:1 to about 100:1 from about 0.5:1 to about 200:1, from about 1:1 to about 500:1, or from about 1:1 to about 1000:1. A particularly useful range is from about 0.5:1 to about 10:1, preferably about 1:1 to about 5:1.

It is also within the scope of this disclosure that the transition metal complexes be activated with combinations of alumoxanes and NCAs (see for example, U.S. Pat. Nos. 5,153,157 and 5,453,410; EP 0 573 120 B1, and International Patent Application Publications WO 1994/007928 and WO 1995/014044, which discuss the use of an alumoxane in combination with an ionizing activator).

Other preferred examples of non-coordinating anion activators may include those that are capable of dissolution in a non-aromatic solvent, such as an aliphatic hydrocarbon solvent. Such non-coordinating anion activators may include, in non-limiting embodiments, a cation component selected from among the following structures.

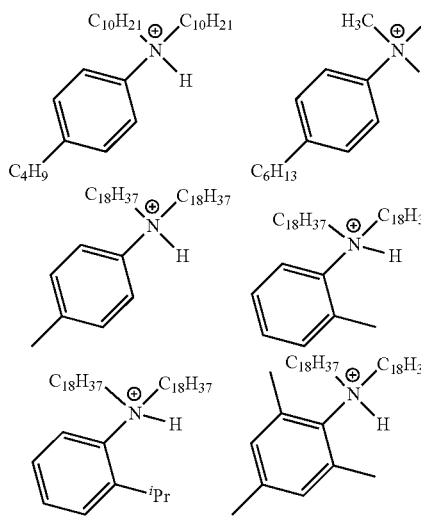

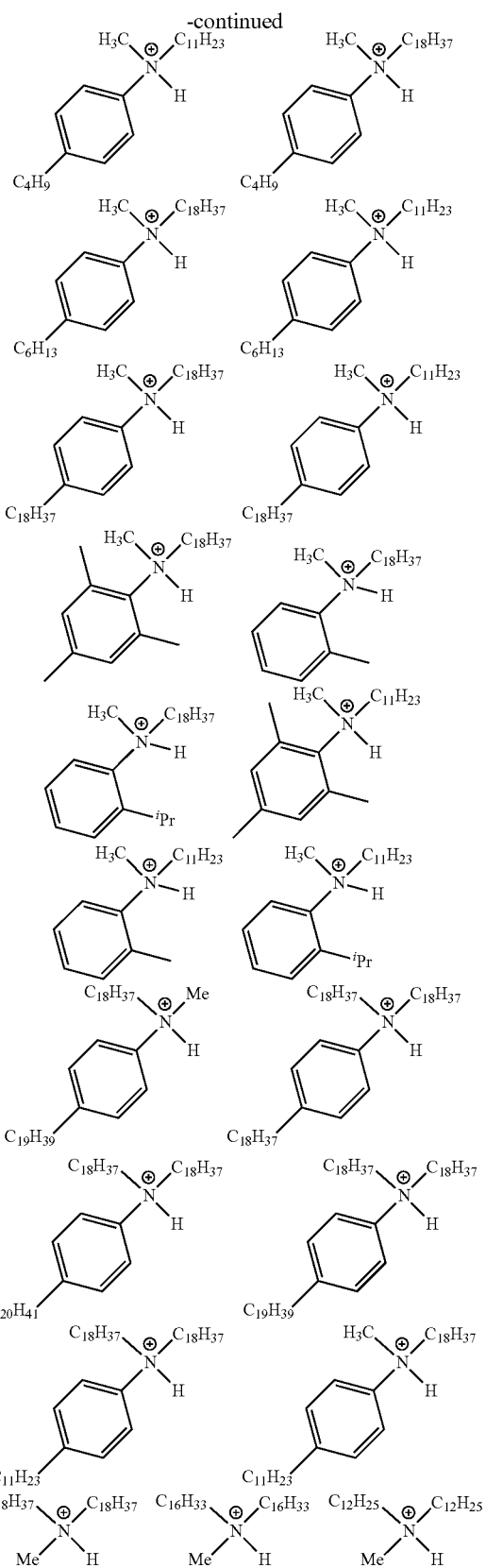

Any of the foregoing cation components may be combined with an anion component selected from among tetrakis (perfluoronaphthyl)borate, tetrakis(perfluorobiphenyl)borate, tetrakis(perfluorophenyl)borate, tetrakis(3,5-bis(trifluoromethyl)phenyl)borate, or the like.

Still other activators that may be useful in the present disclosure include one or more of N,N-di(hydrogenated tallow)methylammonium [tetrakis(perfluorophenyl)borate], N-methyl-4-nonadecyl-N-octadecylanilinium [tetrakis(perfluorophenyl)borate], N-methyl-4-hexadecyl-N-octadecylanilinium [tetrakis(perfluorophenyl)borate], N-methyl-4-tetradecyl-N-octadecylanilinium [tetrakis(perfluorophenyl)borate], N-methyl-4-dodecyl-N-octadecylanilinium [tetrakis(perfluorophenyl)borate], N-methyl-4-decyl-N-octadecylanilinium [tetrakis(perfluorophenyl)borate], N-methyl-4-octyl-N-octadecylanilinium [tetrakis(perfluorophenyl)borate], N-methyl-4-hexyl-N-octadecylanilinium [tetrakis(perfluorophenyl)borate], N-methyl-4-butyl-N-octadecylanilinium [tetrakis(perfluorophenyl)borate], N-methyl-4-octadecyl-N-decylanilinium [tetrakis(perfluorophenyl)borate], N-methyl-4-nonadecyl-N-dodecylanilinium [tetrakis(perfluorophenyl)borate], N-methyl-4-nonadecyl-N-tetradecylanilinium [tetrakis(perfluorophenyl)borate], N-methyl-4-nonadecyl-N-hexadecylanilinium [tetrakis(perfluorophenyl)borate], N-ethyl-4-nonadecyl-N-octadecylanilinium [tetrakis(perfluorophenyl)borate], N-methyl-N,N-dioctadecylammonium [tetrakis(perfluorophenyl)borate], N-methyl-N,N-dihexadecylammonium [tetrakis(perfluorophenyl)borate], N-methyl-N,N-ditetradecylammonium [tetrakis(perfluorophenyl)borate], N-methyl-N,N-didodecylammonium [tetrakis(perfluorophenyl)borate], N-methyl-N,N-didecylammonium [tetrakis(perfluorophenyl)borate], N-methyl-N,N-dioctylammonium [tetrakis(perfluorophenyl)borate], N-ethyl-N,N-dioctadecylammonium [tetrakis(perfluorophenyl)borate], N,N-di(octadecyl)tolylammonium [tetrakis(perfluorophenyl)borate], N,N-di(hexadecyl)tolylammonium [tetrakis(perfluorophenyl)borate], N,N-di(tetradecyl)tolylammonium [tetrakis(perfluorophenyl)borate], N,N-di(dodecyl)tolylammonium [tetrakis(perfluorophenyl)borate], N-octadecyl-N-hexadecyl-tolylammonium [tetrakis(perfluorophenyl)borate], N-octadecyl-N-hexadecyl-tolylammonium [tetrakis(perfluorophenyl)borate], N-octadecyl-N-tetradecyl-tolylammonium [tetrakis(perfluorophenyl)borate], N-octadecyl-N-dodecyl-tolylammonium [tetrakis(perfluorophenyl)borate], N-octadecyl-N-decyl-tolylammonium [tetrakis(perfluorophenyl)borate], N-hexadecyl-N-tetradecyl-tolylammonium [tetrakis(perfluorophenyl)borate], N-hexadecyl-N-dodecyl-tolylammonium [tetrakis(perfluorophenyl)borate], N-hexadecyl-N-decyl-tolylammonium [tetrakis(perfluorophenyl)borate], N-tetradecyl-N-dodecyl-tolylammonium [tetrakis(perfluorophenyl)borate], N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl)borate], N-methyl-N-hexadecylanilinium [tetrakis(perfluorophenyl)borate], N-methyl-N-tetradecylanilinium [tetrakis(perfluorophenyl)borate], N-methyl-N-dodecylanilinium [tetrakis(perfluorophenyl)borate], N-methyl-N-decylanilinium [tetrakis(perfluorophenyl)borate], and N-methyl-N-octylanilinium [tetrakis(perfluorophenyl)borate].

In any embodiment, a catalyst system suitable for use in the present disclosure may be disposed on a solid support. The solid support may allow a catalytic reaction, such as polymerization of an olefinic feed, to be conducted under heterogeneous conditions. In more specific embodiments, the solid support may be silica. Other suitable solid supports may include, but are not limited to, alumina, magnesium chloride, talc, inorganic oxides, or chlorides including one or more metals from Groups 2, 3, 4, 5, 13, or 14 of the Periodic Table, and polymers such as polystyrene, or functionalized and/or cross-linked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In any embodiment, an alumoxane or other suitable activator may be disposed on silica or another suitable solid support before being combined with the transition metal complexes disclosed herein. The transition metal complexes disclosed herein may alternately be disposed upon silica or another suitable support before being combined with an alumoxane or other suitable activator. Upon combining the activator and the solid support with the transition metal complexes, the resulting catalyst system may become disposed upon the solid support.

In any embodiment, an alumoxane, such as MAO, or a non-coordinating anion activator may be mixed in an inert solvent such as toluene and then be slurried with a solid support, such as silica. Alumoxane deposition upon the solid support may occur at a temperature from about 60° C. to 120° C., or about 80° C. to 120° C., or about 100° C. to 120° C. Deposition occurring below 60° C., including room temperature deposition, may also be effective.

In any embodiment, solid supports suitable for use in the disclosure herein may have a surface area ranging from about 1 m$^2$/g to about 1000 m$^2$/g, about 5 m$^2$/g to about 900 m$^2$/g, about 50 m$^2$/g to about 500 m$^2$/g, or about 100 m$^2$/g to about 400 m$^2$/g. In any embodiment, a solid support may have a pore volume ranging from about 0.01 cm$^3$/g to about 4 cm$^3$/g, about 0.1 cm$^3$/g to about 3 cm$^3$/g, about 0.8 cm$^3$/g to about 3 cm$^3$/g, or about 1 cm$^3$/g to about 2.5 cm$^3$/g. In any embodiment, a solid support may have an average particle size ranging from about 0.1 µm low of about 500 µm, about 0.3 µm to about 400 µm, about 0.5 µm to about 250 µm, about 1 µm to about 200 µm, about 5 µm to about 150 µm, or about 10 µm to about 100 µm.

The catalyst activity of the transition metal complexes described herein may reside in a range of about 2,000 g/mmol·hr to about 10,000,000 g/mmol·hr when employed in a catalyst system for polymerizing or oligomerizing, ethylene, propylene, a $C_6$-$C_{32}$ alpha olefin, or any combination thereof.

Methods suitable for generating vinylidene-terminated polyalphaolefins are also described herein. Vinylidene-terminated polyalphaolefins may be generated by contacting a catalyst system, as specified herein, with an olefinic feed comprising an alpha olefin under polymerization reaction conditions to obtain a polymerized reaction product comprising at least a vinylidene-terminated polyalphaolefin. The olefinic feed may comprise one or more $C_2$-$C_{32}$ alpha olefins, preferably one or more $C_3$-$C_{32}$ alpha olefins, and more preferably one or more $C_6$-$C_{32}$ alpha olefins.

Any olefinic feed may be polymerized using the catalyst systems disclosed herein, preferably an olefinic feed comprising one or more alpha olefins. Suitable olefinic feeds may include any $C_2$-$C_{32}$ alpha olefin, preferably a $C_6$-$C_{32}$ alpha olefin, or any combination thereof. In more specific embodiments, the olefinic feed may comprise one or more $C_6$-$C_{32}$ alpha olefins such as, for example, 1-hexene, 1-heptene, 1-octene, 1-nonene, 1-decene, 1-undecene, 1-dodecene, 1-tetradecene, 1-hexadecene, 1-octadecene, 1-eicosene, the like or any combination thereof. The olefinic feed may comprise any single alpha olefin or any mixture of one or more of the foregoing alpha olefins in any ratio.

Polymerization processes of this disclosure may be carried out in any manner known in the art. Any suspension, homogeneous, bulk, solution, slurry, or gas-phase polymerization process known in the art may be used. Such processes may be run in a batch, semi-batch, or continuous mode. The term "continuous" means a system that operates without interruption or cessation. For example, a continuous process to produce a polymer or oligomer would be one where the reactants are continually introduced into one or more reactors and the polymer or oligomer product is continually withdrawn. Homogeneous polymerization processes and slurry processes are useful. A homogeneous polymerization process is defined to be a process where at least 90 wt % of the product is soluble in the reaction media. A bulk homogeneous process is particularly preferred. A bulk process is defined to be a process where monomer concentration in all feeds to the reactor is 70 vol % or more. Alternatively, no solvent or diluent is present or added in the reaction medium, (except for the small amounts used as the carrier for the catalyst system or other additives, or amounts typically found with the monomer (e.g., propane in propylene). Alternatively, the process may be a slurry process. As used herein the term "slurry polymerization process" means a polymerization process where a supported catalyst is employed and monomers are polymerized on the supported catalyst particles. At least 95 wt % of polyalphaolefins derived from the supported catalyst are in granular form as solid particles (not dissolved in the diluent). A heterogeneous process is defined to be a process where the catalyst system is not soluble in the reaction medium.

Other additives may also be used in the polymerization, as desired, such as one or more scavengers, promoters, modifiers, chain transfer agents (such as diethyl zinc), hydrogen, aluminum alkyls, or silanes. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof. These compounds may also functions as scavengers in some instances.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as may be found commercially (Isopar™); perhalogenated hydrocarbons, such as perfluorinated $C_{4-10}$ alkanes, chlorobenzene, and aromatic and aromatic compounds, such as benzene, toluene, mesitylene, and xylene. Suitable solvents also include liquid olefins, which optionally may act as monomers or co-monomers, such as, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In any embodiment, the solvent may be substantially absent any aromatic compounds. For example, aromatic compounds may be present in the solvent at less than 1 wt %, preferably less than 0.5 wt %, preferably less than 0 wt % based upon the weight of the solvents. In any embodiment, a feed stream may comprise a diluent/solvent from about 60 vol % or less, about 40 vol % or less, or 20 vol % or less, based on the total volume of the feed stream. This includes from 0 vol % to about 60 vol %, from about 0 vol % to about 40 vol %, and about 0 vol % to about 20 vol %.

Typical polymerization reaction conditions may include a temperature in the range of about 0° C. to about 300° C. and a pressure in the range of about 0.35 MPa to about 10 MPa. Preferably, the reaction temperature may be about 80° C. or more, more preferably about 80° C. to about 200° C., or about 80° C. to about 140° C., or about 100° C. to about 130° C.

Polymerization run times may be up to about 300 minutes, for example, in the range of from about 5 minutes to about 250 minutes, which includes from about 10 minutes to about 120 minutes. For continuous polymerization processes, the run time may correspond to a residence time in the reactor.

Hydrogen may be included in the polymerization reaction conditions to provide increased catalyst activity without significantly impairing the ability of the transition metal complexes to produce vinylidene termination. Catalyst activity (calculated as g/mmol catalyst/hour) may be at least 20% higher than the same reaction without hydrogen present, which includes at least 50% higher and at least 100% higher. The activity of the catalyst may be at least about 50 g/mmol/hour, at least about 500 g/mmol/hour, at least about 5,000 g/mmol/hour, or at least about 50,000 g/mmol/hour in the presence of hydrogen. The conversion of an olefinic feed, based upon oligomer yield and the weight of the olefin monomer entering the reaction zone, may be at least about 10%, at least about 20%, at least about 30%, at least about 50%, or at least about 80%.

Polymerization of an olefinic feed stream may be carried out in a reaction zone within a reactor. A system may include multiple reactors and/or multiple reaction zones. A reactor may be a batch reactor, a semi-batch reactor, or a continuous reactor. Examples of suitable continuous reactors include continuous stirred tanks (and trains thereof), loop-type reactors, and fluidized bed reactors. Multiple reactors may be in series or in parallel. A reactor includes at least one reaction zone comprising a transition metal complex of the present disclosure as a polymerization catalyst. A reactor may further include at least one inlet, configured and arranged to receive an olefinic feed and at least one outlet, configured and arranged to receive a product stream. In any embodiment where two or more different alpha olefins are reacted, a reactor may include additional inlets for receiving a stream comprising additional monomers. A reactor may further comprise one or more additional inlets for introducing one or more of a catalyst (e.g., a transition metal complex as specified herein), diluent, or any other material, for example, a hydrogen stream, and/or a catalyst poison, into the reactor. A system may also comprise conduits for conveying spent catalyst to a catalyst regeneration system. A system comprising a reactor may also comprise equipment, processors, and controls for regulating various reactor conditions including, but not limited to, pressure, temperature, and flow rate. A system comprising a reactor may also comprise equipment and plumbing to recycle un-used monomer, process gas, hydrogen, or any combination thereof, back into the system. One of ordinary skill in the art will be able to employ the catalyst systems disclosed herein to generate a product stream comprising a high yield of vinylidene-terminated polyalphaolefins using reactors and equipment well known in the art without undue experimentation, given the benefit of the present disclosure.

Processing of the polyalphaolefins may take place following the polymerization or oligomerization reaction. Suitable processing operations may include, but are not limited to, blending, or co-extrusion with any other polymer. Non-limiting examples of other polymers include linear low-density polyethylenes, elastomers, plastomers, high-pressure low-density polyethylene, high-density polyethylenes, polypropylenes, and the like. The oligomers formed according to the present disclosure may also be blended with additives to form compositions that may then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

Preferably, the polymerized reaction products formed according to the disclosure herein may comprise at least about 80 mol % vinylidene-terminated polyalphaolefins based on total moles of olefins in the polymerized reaction product. More preferably, the polymerized reaction products may comprise at least about 85 mol % vinylidene-terminated polyalphaolefins, or at least about 90 mol % vinylidene-terminated polyalphaolefins, or at least about 95 mol % vinylidene-terminated polyalphaolefins. The balance of the polymerized reaction products may comprise one or more polyalphaolefins comprising a termination selected from a vinyl group, a trisubstituted vinylene group, a disubstituted vinylene group, and any combination thereof. In particular process configurations about 10 mol % or less vinylenes may be produced, preferably about 5 mol % or less vinylenes; about 8 mol % or less trisubstituted vinylenes may be produced, preferably about 5 mol % or less trisubstituted vinylenes, more preferably about 3 mol % or less trisubstituted vinylenes; and about 8 mol % or less vinyls, preferably about 1 mol % or less vinyls.

Polyalphaolefins prepared according to the disclosure here may have a Mn molecular weight (as measured by $^1$H NMR and described elsewhere herein) of about 10,000 g/mol or less, alternately 7,500 g/mol or less, alternately 6,000 g/mol or less, alternately 5,000 g/mol or less, or about 2,500 g/mol or less, or about 1,200 g/mol or less, or about 800 g/mol or less, or about 600 g/mol or less, or about 500 g/mol or less, alternately from 100 g/mol to 10,000 g/mol, alternately 150 g/mol to 5,000 g/mol, alternately from 200 g/mol to 2,500 g/mol, alternately from 250 g/mol to 2,000 g/mol, alternately 250 g/mol to 1,500 g/mol. Depending on the alpha olefin undergoing oligomerization and the process temperature, the Mn molecular weight may vary over a considerable range. In general, ethylene may afford higher Mn values than does propylene, and both of these alpha olefins may afford higher Mn values than does a $C_6$-$C_{32}$ alpha olefin. $C_6$-$C_{32}$ alpha olefins, in particular, may afford Mn values of about 1,000 or below, preferably Mn values of about 800 or below, and more preferably Mn values of about 600 or below.

Polyalphaolefins prepared according to the disclosure herein may feature a polydispersity index (PDI), Mw/Mn (as measured by $^1$H NMR), in a range of about 1.2 to about 3.0, preferably about 1.5 to about 2.5.

The vinylidene-terminated polyalphaolefins prepared according to the disclosure herein may be functionalized by reacting a heteroatom-containing group (e.g., amines, aldehydes, alcohols, acids, succinic acid, maleic acid, maleic anhydride) with the methylene group of the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides). Functionalized polyalphaolefins may be used in oil additivation and many other applications, for example, additives for lubricants and/or fuels. In addition, the polyalphaolefins may be hydrogenated to form the corresponding methyl paraffin compounds.

A vinylidene-terminated polyalphaolefin may also be used as a macromonomer for the preparation of polymeric materials. Processes that may be used for the preparation of these products include coordinative polymerization and acid-catalyzed polymerization.

Embodiments disclosed herein include:
A. Polymerization Methods. The methods comprise: contacting a catalyst system with an olefinic feed comprising an alpha olefin under polymerization reaction conditions to obtain a polymerized reaction product comprising at least a vinylidene-terminated polyalphaolefin; wherein the catalyst system comprises an activator and a transition metal complex represented by the formula

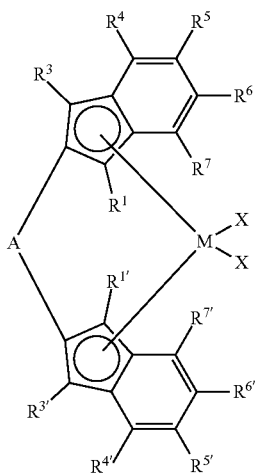

or a reaction product thereof; wherein: M is a group 4 transition metal; A is a bridging group having one bridging atom extending between a first indenyl ring and a second indenyl ring; each X is independently an anionic ligand, or two Xs are joined and bound to M to form a metallocycle ring, or two Xs are joined to form a chelating ligand, a diene ligand, or an alkylidene ligand; $R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

B. Metallocene compositions. The metallocene compositions comprise: a transition metal complex represented by the formula

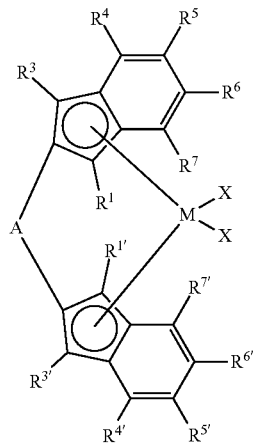

wherein: M is a group 4 transition metal; A is a bridging group having one bridging atom extending between a first indenyl ring and a second indenyl ring; each X is independently an anionic ligand, or two Xs are joined and bound to M to form a metallocycle ring, or two Xs are joined to form a chelating ligand, a diene ligand, or an alkylidene ligand; $R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

C. Catalyst systems. The catalyst systems comprise: an activator; and a transition metal complex represented by the formula

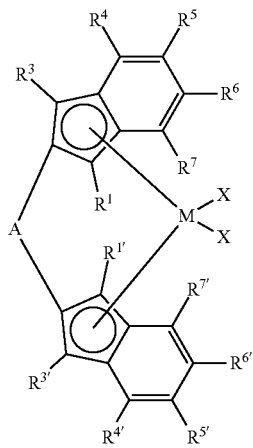

or a reaction product thereof; wherein: M is a group 4 transition metal; A is a bridging group having one bridging atom extending between a first indenyl ring and a second indenyl ring; each X is independently an anionic ligand, or two Xs are joined and bound to M to form a metallocycle ring, or two Xs are joined to form a chelating ligand, a diene ligand, or an alkylidene ligand; $R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

Embodiments A-C may include one or more of the following elements in any combination:

Element 1: wherein A is selected from the group consisting of S, O, PR', NR', SiR"$_2$, GeR"$_2$, CH$_2$, CHR", and CR"$_2$; wherein R' is a $C_1$-$C_{30}$, optionally substituted, hydrocarbyl group, and R" is hydrogen or a $C_1$-$C_{30}$, optionally substituted, hydrocarbyl group.

Element 2: wherein A is selected from the group consisting of S, O, PR', NR', SiR"$_2$, GeR"$_2$, and CR"$_2$; wherein R' is a $C_1$-$C_{30}$, optionally substituted, hydrocarbyl group, and R" is hydrogen or a $C_1$-$C_{30}$, optionally substituted, hydrocarbyl group.

Element 3: wherein A is selected from the group consisting of S, O, PR', NR', SiR"$_2$, and GeR"$_2$; wherein R' is a $C_1$-$C_{30}$, optionally substituted, hydrocarbyl group, and R" is hydrogen or a $C_1$-$C_{30}$, optionally substituted, hydrocarbyl group.

Element 4: wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

Element 5: wherein each X is an alkyl group independently selected from the group consisting of methyl, ethyl, propyl, butyl, and pentyl.

Element 6: wherein each X is a halide independently selected from the group consisting of fluoro, chloro, and bromo.

Element 7: wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

Element 8: wherein M is Hf or Zr.

Element 9: wherein M is Zr.

Element 10: wherein the polymerized reaction product comprises at least about 80 mol % vinylidene-terminated polyalphaolefin based on total moles of olefins in the polymerized reaction product.

Element 11: wherein the polymerized reaction product further comprises one or more polyalphaolefins comprising a vinyl group, a trisubstituted vinylene group, a disubstituted vinylene group, or any combination thereof.

Element 12: wherein the polymerization reaction conditions comprise a reaction temperature of about 80° C. or more.

Element 13: wherein the activator comprises an alumoxane.

Element 14: wherein the activator comprises methylalumoxane.

Element 15: wherein the activator comprises a non-coordinating anion.

Element 16: wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, 1-(4-(tris(pentafluorophenyl)borate)-2,3,5,6-tetrafluorophenyl) pyrrolidinium; $[Me_3NH^+][B(C_6F_5)^{4-}]$, 1-(4-(tris(pentafluorophenyl)borate)-,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

Element 17: wherein the alpha olefin comprises at least one $C_6$-$C_{32}$ alpha olefin.

Element 18: wherein the alpha olefin comprises at least one $C_8$-$C_{14}$ alpha olefin.

Element 19: wherein the alpha olefin comprises at least one alpha olefin selected from the group consisting of 1-octene, 1-decene, 1-dodecene, 1-tetradecene, and any combination thereof.

By way of non-limiting example, exemplary combinations applicable to B include, but are not limited to: 1, 2, or 3, and 4, 5, or 6; 1, 2, or 3, and 7; 1, 2, or 3, and 8 or 9; 4, 5, or 6, and 7; 4, 5, or 6, and 8 or 9; and 7 and 8 or 9. Exemplary combinations applicable to C include, but are not limited to, 1, 2, or 3, and 4, 5, or 6; 1, 2, or 3, and 7; 1, 2, or 3, and 8 or 9; 4, 5, or 6, and 7; 4, 5, or 6, and 8 or 9; 7 and 8 or 9; 1, 2, or 3, and 13; 1, 2, or 3, and 14; 1, 2, or 3, and 15; 1, 2, or 3, and 15 and 16; 4, 5, or 6, and 13; 4, 5, or 6, and 14; 4, 5, or 6, and 15; 4, 5, or 6, and 15 and 16; 7 and 13; 7 and 14; 7 and 15; 7 and 15 and 16; 8 or 9, and 13; 8 or 9, and 14; 8 or 9, and 15; 8 or 9, and 15 and 16; and 1, 2, or 3, 4, 5, or 6, and 13 or 15. Exemplary combinations applicable to A include, but are not limited to, 1, 2, or 3, and 4, 5, or 6; 1, 2, or 3, and 7; 1, 2, or 3, and 8 or 9; 4, 5, or 6, and 7; 4, 5, or 6, and 8 or 9; 7 and 8 or 9; 1, 2, or 3, and 13; 1, 2, or 3, and 14; 1, 2, or 3, and 15; 1, 2, or 3, and 15 and 16; 4, 5, or 6, and 13; 4, 5, or 6, and 14; 4, 5, or 6, and 15; 4, 5, or 6, and 15 and 16; 7 and 13; 7 and 14; 7 and 15; 7 and 15 and 16; 8 or 9, and 13; 8 or 9, and 14; 8 or 9, and 15; 8 or 9, and 15 and 16; and 1, 2, or 3, 4, 5, or 6, and 13 or 15, any of which may be in further combination with one or more of 10, 11, 12, 17, 18 or 19; 10 and 11; 10 and 12; 10 and 17; 10 and 18; 10 and 19; 11 and 12; 11 and 17; 11 and 18; or 11 and 19. Further exemplary combinations applicable to A include, but are not limited to 10 and 11; 10 and 12; 10 and 17; 10 and 18; 10 and 19; 11 and 12; 11 and 17; 11 and 18; or 11 and 19.

The present disclosure relates to:
1. A method comprising:
    contacting a catalyst system with an olefinic feed comprising an alpha olefin under polymerization reaction conditions to obtain a polymerized reaction product comprising at least a vinylidene-terminated polyalphaolefin;
    wherein the catalyst system comprises an activator and a transition metal complex represented by the formula

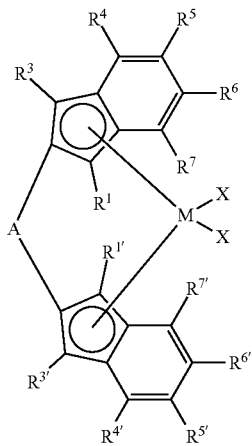

or a reaction product thereof;
wherein:
    M is a group 4 transition metal;
    A is a bridging group having one bridging atom extending between a first indenyl ring and a second indenyl ring;
    each X is independently an anionic ligand, or two Xs are joined and bound to M to form a metallocycle ring, or two Xs are joined to form a chelating ligand, a diene ligand, or an alkylidene ligand;
    $R^1$, $R^{1'}$, $R^3$, $R^{3'}$, $R^4$, $R^{4'}$, $R^7$ and $R^{7'}$ are hydrogen; and
    $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

2. The method of paragraph 1, wherein A is selected from the group consisting of S, O, PR', NR', SiR''$_2$, GeR''$_2$, CH$_2$, CHR'', and CR''$_2$;
    wherein R' is a $C_1$-$C_{30}$, optionally substituted, hydrocarbyl group, and R'' is hydrogen or a $C_1$-$C_{30}$, optionally substituted, hydrocarbyl group.

3. The method of paragraph 1 or paragraph 2, wherein A is selected from the group consisting of S, O, PR', NR', SiR''$_2$, GeR''$_2$, and CR''$_2$;
    wherein R' is a $C_1$-$C_{30}$, optionally substituted, hydrocarbyl group, and R'' is hydrogen or a $C_1$-$C_{30}$, optionally substituted, hydrocarbyl group.

4. The method of any one of paragraphs 1-3, wherein A is selected from the group consisting of S, O, PR', NR', SiR''$_2$, and GeR''$_2$;
    wherein R' is a $C_1$-$C_{30}$, optionally substituted, hydrocarbyl group, and R'' is hydrogen or a $C_1$-$C_{30}$, optionally substituted, hydrocarbyl group.

5. The method of any one of paragraphs 1-4, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

6. The method of any one of paragraphs 1-5, wherein each X is an alkyl group independently selected from the group consisting of methyl, ethyl, propyl, butyl, and pentyl.

7. The method of any one of paragraphs 1-5, wherein each X is a halide independently selected from the group consisting of fluoro, chloro, and bromo.

8. The method of any one of paragraphs 1-7, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

9. The method of any preceding paragraph, wherein M is Hf or Zr.

10. The method of any preceding paragraph, wherein M is Zr.

11. The method of any preceding paragraph, wherein the polymerized reaction product comprises at least about 80 mol % vinylidene-terminated polyalphaolefin based on total moles of olefins in the polymerized reaction product.

12. The method of any preceding paragraph, wherein the polymerized reaction product further comprises one or more polyalphaolefins comprising a vinyl group, a trisubstituted vinylene group, a disubstituted vinylene group, or any combination thereof.

13. The method of any preceding paragraph, wherein the polymerization reaction conditions comprise a reaction temperature of about 80° C. or more.

14. The method of any preceding paragraph, wherein the activator comprises an alumoxane.

15. The method of any preceding paragraph, wherein the activator comprises methylalumoxane.

16. The method of any one of paragraphs 1-13, wherein the activator comprises a non-coordinating anion.

17. The method of paragraph 16, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Me$_3$NH$^+$][B(C$_6$F$_5$)$_4^-$], 1-(4-(tris (pentafluorophenyl)borate)-2,3,5,6-tetrafluorophenyl) pyrrolidinium; [Me$_3$NH$^+$][B(C$_6$F$_5$)$_4^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl) borate)-2,3,5,6-tetrafluoropyridinium.

18. The method of any preceding paragraph, wherein the alpha olefin comprises at least one $C_6$-$C_{32}$ alpha olefin.

19. The method of any preceding paragraph, wherein the alpha olefin comprises at least one $C_8$-$C_{14}$ alpha olefin.

20. The method of any preceding paragraph, wherein the alpha olefin comprises at least one alpha olefin selected from the group consisting of 1-octene, 1-decene, 1-dodecene, 1-tetradecene, and any combination thereof.

21. A composition comprising:
a transition metal complex represented by the formula

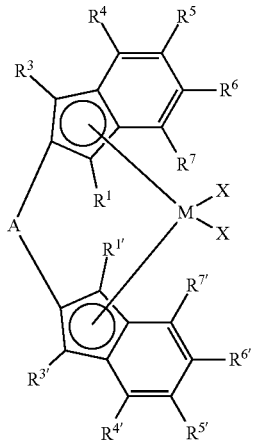

wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

22. The composition of paragraph 21, wherein A is selected from the group consisting of S, O, PR', NR', SiR''$_2$, GeR''$_2$, CH$_2$, CHR'', and CR''$_2$;
wherein R' is a $C_1$-$C_{30}$, optionally substituted, hydrocarbyl group and R'' is hydrogen or a $C_1$-$C_{30}$, optionally substituted, hydrocarbyl group.

23. The composition of paragraph 21 or paragraph 22, wherein A is selected from the group consisting of S, O, PR', NR', SiR''$_2$, GeR''$_2$, and CR''$_2$;
wherein R' is a $C_1$-$C_{30}$, optionally substituted, hydrocarbyl group and R'' is hydrogen or a $C_1$-$C_{30}$, optionally substituted, hydrocarbyl group.

24. The composition of any one of paragraphs 21-23, wherein A is selected from the group consisting of S, O, PR', NR', SiR''$_2$, and GeR''$_2$
wherein R' is a $C_1$-$C_{30}$, optionally substituted, hydrocarbyl group and R'' is hydrogen or a $C_1$-$C_{30}$, optionally substituted, hydrocarbyl group.

25. The composition of any one of paragraphs 21-24, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

26. The composition of any one of paragraphs 21-25, wherein each X is an alkyl group independently selected from the group consisting of methyl, ethyl, propyl, butyl, and pentyl.

27. The composition of any one of paragraphs 21-25, wherein each X is a halide independently selected from the group consisting of fluoro, chloro, and bromo.

28. The composition of any one of paragraphs 21-27, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

29. The composition of any one of paragraphs 21-28, wherein M is Hf or Zr.

30. The composition of any one of paragraphs 21-29, wherein M is Zr.

31. A catalyst system comprising:
an activator; and
a transition metal complex represented by the formula

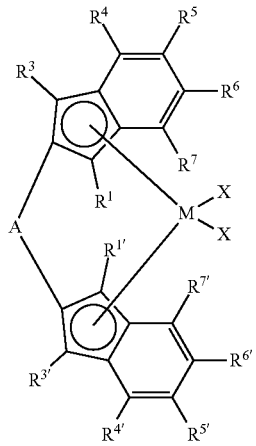

or a reaction product thereof;
wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

32. The catalyst system of paragraph 31, wherein A is selected from the group consisting of S, O, PR', NR', SiR''$_2$, GeR''$_2$, CH$_2$, CHR'', and CR''$_2$;
wherein R' is a $C_1$-$C_{30}$, optionally substituted, hydrocarbyl group and R'' is hydrogen or a $C_1$-$C_{30}$, optionally substituted, hydrocarbyl group.

33. The catalyst system of paragraph 31 or paragraph 32, wherein A is selected from the group consisting of S, O, PR', NR', SiR''$_2$, GeR''$_2$, and CR''$_2$;
wherein R' is a $C_1$-$C_{30}$, optionally substituted, hydrocarbyl group and R'' is hydrogen or a $C_1$-$C_{30}$, optionally substituted, hydrocarbyl group.

34. The catalyst system of any one of paragraphs 31-33, wherein A is selected from the group consisting of S, O, PR', NR', SiR''$_2$ and GeR''$_2$
wherein R' is a $C_1$-$C_{30}$, optionally substituted, hydrocarbyl group and R'' is hydrogen or a $C_1$-$C_{30}$, optionally substituted, hydrocarbyl group.

35. The catalyst system of any one of paragraphs 31-34, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

36. The catalyst system of any one of paragraphs 31-35, wherein each X is an alkyl group independently selected from the group consisting of methyl, ethyl, propyl, butyl, and pentyl.

37. The catalyst system of any one of paragraphs 31-35, wherein each X is a halide independently selected from the group consisting of fluoro, chloro, and bromo.
38. The catalyst system of any one of paragraphs 31-37, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.
39. The catalyst system of any one of paragraphs 31-38, wherein M is Hf or Zr.
40. The catalyst system of any one of paragraphs 31-39, wherein M is Zr.
41. The catalyst system of any one of paragraphs 31-40, wherein the activator comprises an alumoxane.
42. The catalyst system of any one of paragraphs 31-41, wherein the activator comprises methylalumoxane.
43. The catalyst system of any one of paragraphs 31-40, wherein the activator comprises a non-coordinating anion.
44. The catalyst system of paragraph 43, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl) phenyl)borate, triphenylcarbenium tetrakis(perfluoronaphthyl)borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Me$_3$NH$^+$][B(C$_6$F$_5$)$^{4-}$], 1-(4-(tris (pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl) borate)-2,3,5,6-tetrafluoropyridinium.

The present disclosure also relates to:
1A. A method comprising:
contacting a catalyst system with an olefinic feed comprising an alpha olefin under polymerization reaction conditions to obtain a polymerized reaction product comprising at least a vinylidene-terminated polyalphaolefin;
wherein the catalyst system comprises an activator and a transition metal complex represented by the formula

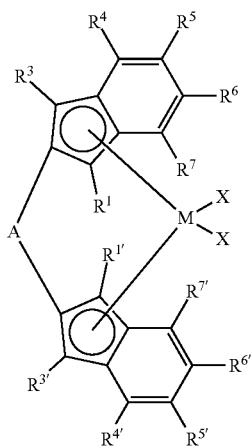

or a reaction product thereof;
wherein:
M is a group 4 transition metal;
A is a bridging group having one bridging atom extending between a first indenyl ring and a second indenyl ring;

each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.
2A. The method of paragraph 1A, wherein A is selected from the group consisting of S, O, PR', NR', SiR"$_2$, GeR"$_2$, CH$_2$, CHR", and CR"$_2$;
wherein R' is a $C_1$-$C_{30}$, optionally substituted, hydrocarbyl group, and R" is hydrogen or a $C_1$-$C_{30}$, optionally substituted, hydrocarbyl group.
3A. The method of paragraph 1A, wherein A is selected from the group consisting of S, O, PR', NR', SiR"$_2$, GeR"$_2$, and CR"$_2$;
wherein R' is a $C_1$-$C_{30}$, optionally substituted, hydrocarbyl group, and R" is hydrogen or a $C_1$-$C_{30}$, optionally substituted, hydrocarbyl group.
4A. The method of paragraph 1A, wherein A is selected from the group consisting of S, O, PR', NR', SiR"$_2$, and GeR"$_2$;
wherein R' is a $C_1$-$C_{30}$, optionally substituted, hydrocarbyl group, and R" is hydrogen or a $C_1$-$C_{30}$, optionally substituted, hydrocarbyl group.
5A. The method of any one of paragraphs 1A-4A, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.
6A. The method of paragraph 1A, wherein each X is an alkyl group independently selected from the group consisting of methyl, ethyl, propyl, butyl, and pentyl.
7A. The method of paragraph 1A, wherein each X is a halide independently selected from the group consisting of fluoro, chloro, and bromo.
8A. The method of any one of paragraphs 1A-4A, 6A, or 7A, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.
9A. The method of any one of paragraphs 1A-4A, 6A, or 7A, wherein M is Hf or Zr.
10A. The method of paragraph 1A, wherein M is Zr.
11A. The method of any one of paragraphs 1A-4A, 6A, 7A, or 10A, wherein the polymerized reaction product comprises at least about 80 mol % vinylidene-terminated polyalphaolefin based on total moles of olefins in the polymerized reaction product.
12A. The method of any one of paragraphs 1A-4A, 6A, 7A, or 10A, wherein the polymerized reaction product further comprises one or more polyalphaolefins comprising a vinyl group, a trisubstituted vinylene group, a disubstituted vinylene group, or any combination thereof.
13A. The method of any one of paragraphs 1A-4A, 6A, 7A, or 10A, wherein the polymerization reaction conditions comprise a reaction temperature of about 80° C. or more.
14A. The method of any one of paragraphs 1A-4A, 6A, 7A, or 10A, wherein the activator comprises an alumoxane.
15A. The method of any one of paragraphs 1A-4A, 6A, 7A, or 10A, wherein the activator comprises methylalumoxane.
16A. The method of any one of paragraphs 1A-4A, 6A, 7A, or 10A, wherein the activator comprises a non-coordinating anion.
17A. The method of paragraph 16A, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl) phenyl)borate, triphenylcarbenium tetrakis(perfluoronaphthyl)borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, $[Me_3NH^+][B(C_6F_5)^{4-}]$, 1-(4-(tris (pentafluorophenyl)borate)-2,3,5,6-tetrafluorophenyl) pyrrolidinium; $[Me_3NH^+][B(C_6F_5)^{4-}]$, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl) borate)-2,3,5,6-tetrafluoropyridinium.

18A. The method of any one of paragraphs 1A-4A, 6A, 7A, or 10A, wherein the alpha olefin comprises at least one $C_6$-$C_{32}$ alpha olefin.

19A. The method of any one of paragraphs 1A-4A, 6A, 7A, or 10A, wherein the alpha olefin comprises at least one $C_8$-$C_{14}$ alpha olefin.

20A. The method of any one of paragraphs 1A-4A, 6A, 7A, or 10A, wherein the alpha olefin comprises at least one alpha olefin selected from the group consisting of 1-octene, 1-decene, 1-dodecene, 1-tetradecene, and any combination thereof.

21A. A composition comprising:
a transition metal complex represented by the formula

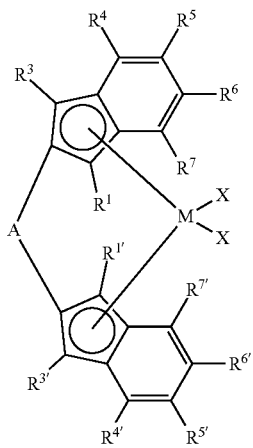

wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

22A. The composition of paragraph 21A, wherein A is selected from the group consisting of S, O, PR', NR', SiR"$_2$, GeR"$_2$, $CH_2$, CHR", and CR"$_2$;
wherein R' is a $C_1$-$C_{30}$, optionally substituted, hydrocarbyl group and R" is hydrogen or a $C_1$-$C_{30}$, optionally substituted, hydrocarbyl group.

23A. The composition of paragraph 21A, wherein A is selected from the group consisting of S, O, PR', NR', SiR"$_2$, GeR"$_2$, and CR"$_2$;
wherein R' is a $C_1$-$C_{30}$, optionally substituted, hydrocarbyl group and R" is hydrogen or a $C_1$-$C_{30}$, optionally substituted, hydrocarbyl group.

24A. The composition of paragraph 21A, wherein A is selected from the group consisting of S, O, PR', NR', SiR"$_2$, and GeR"$_2$
wherein R' is a $C_1$-$C_{30}$, optionally substituted, hydrocarbyl group and R" is hydrogen or a $C_1$-$C_{30}$, optionally substituted, hydrocarbyl group.

25A. The composition of any one of paragraphs 21A-24A, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

26A. The composition of paragraph 21A, wherein each X is an alkyl group independently selected from the group consisting of methyl, ethyl, propyl, butyl, and pentyl.

27A. The composition of paragraph 21A, wherein each X is a halide independently selected from the group consisting of fluoro, chloro, and bromo.

28A. The composition of any one of paragraphs 21A-24A, 26A, or 27A, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

29A. The composition of any one of paragraphs 21A-24A, 26A, or 27A, wherein M is Hf or Zr.

30A. The composition of paragraph 28A, wherein M is Zr.

31A. A catalyst system comprising:
an activator; and
a transition metal complex represented by the formula

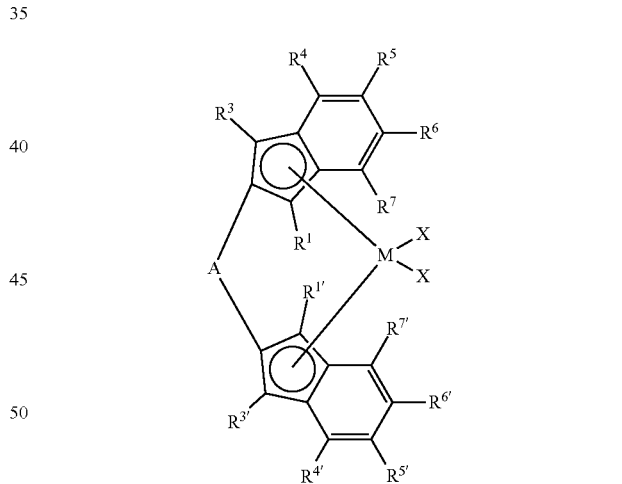

or a reaction product thereof;
wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

32A. The catalyst system of paragraph 31A, wherein A is selected from the group consisting of S, O, PR', NR', SiR"$_2$, GeR"$_2$, CH$_2$, CHR", and CR"$_2$;
wherein R' is a C$_1$-C$_{30}$, optionally substituted, hydrocarbyl group and R" is hydrogen or a C$_1$-C$_{30}$, optionally substituted, hydrocarbyl group.

33A. The catalyst system of paragraph 31A, wherein A is selected from the group consisting of S, O, PR', NR', SiR"$_2$, GeR"$_2$, and CR"$_2$;
wherein R' is a C$_1$-C$_{30}$, optionally substituted, hydrocarbyl group and R" is hydrogen or a C$_1$-C$_{30}$, optionally substituted, hydrocarbyl group.

34A. The catalyst system of paragraph 31A, wherein A is selected from the group consisting of S, O, PR', NR', SiR"$_2$ and GeR"$_2$
wherein R' is a C$_1$-C$_{30}$, optionally substituted, hydrocarbyl group and R" is hydrogen or a C$_1$-C$_{30}$, optionally substituted, hydrocarbyl group.

35A. The catalyst system of any one of paragraphs 31A-34A, wherein each X is independently selected from the group consisting of a C$_1$-C$_{20}$ hydrocarbyl group, a hydride, an alkoxide, a sulfide, a phosphide, a halide, a diene, an amine, a phosphine, an ether, and any combination thereof.

36A. The catalyst system of paragraph 31A, wherein each X is an alkyl group independently selected from the group consisting of methyl, ethyl, propyl, butyl, and pentyl.

37A. The catalyst system of paragraph 31A, wherein each X is a halide independently selected from the group consisting of fluoro, chloro, and bromo.

38A. The catalyst system of any one of paragraphs 31A-34A, 36A, or 37A, wherein R$^5$, R$^6$, R$^{5'}$ and R$^{6'}$ are each an independently selected C$_1$-C$_{10}$, optionally substituted, alkyl group, or R$^5$ and R$^6$ and/or R$^{5'}$ and R$^{6'}$ are independently a C$_1$-C$_4$ hydrocarbyl group bonded together to form a ring structure.

39A. The catalyst system of any one of paragraphs 31A-34A, 36A, or 37A, wherein M is Hf or Zr.

40A. The catalyst system of paragraph 31A, wherein M is Zr.

41A. The catalyst system of any one of paragraphs 31A-34A, 36A, 37A, or 40A, wherein the activator comprises an alumoxane.

42A. The catalyst system of any one of paragraphs 31A-34A, 36A, 37A, or 40A, wherein the activator comprises methylalumoxane.

43A. The catalyst system of any one of paragraphs 31A-34A, 36A, 37A, or 40A, wherein the activator comprises a non-coordinating anion.

44A. The catalyst system of paragraph 43A, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

The present disclosure still further relates to:
1B. A method comprising:
contacting a catalyst system with an olefinic feed comprising an alpha olefin under polymerization reaction conditions to obtain a polymerized reaction product comprising at least a vinylidene-terminated polyalphaolefin;
wherein the catalyst system comprises an activator and a transition metal complex represented by the formula

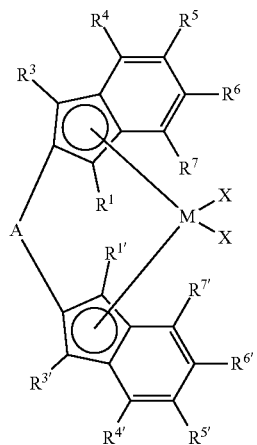

or a reaction product thereof;
wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
R$^1$, R$^{1'}$, R$^3$, R$^{3'}$, R$^4$, R$^{4'}$, R$^7$ and R$^{7'}$ are hydrogen; and
R$^5$, R$^{5'}$, R$^6$, and R$^{6'}$ are independently a C$_1$-C$_{10}$, optionally substituted, hydrocarbyl group, or R$^5$ and R$^6$ and/or R$^{5'}$ and R$^{6'}$ are bonded together to form an optionally substituted hydrocarbyl ring structure.

2B. The method of paragraph 1B, wherein A is selected from the group consisting of S, O, PR', NR', SiR"$_2$, GeR"$_2$, CH$_2$, CHR", and CR"$_2$;
wherein R' is a C$_1$-C$_{30}$, optionally substituted, hydrocarbyl group, and R" is hydrogen or a C$_1$-C$_{30}$, optionally substituted, hydrocarbyl group.

3B. The method of paragraph 1B, wherein A is selected from the group consisting of S, O, PR', NR', SiR"$_2$, GeR"$_2$, and CR"$_2$;
wherein R' is a C$_1$-C$_{30}$, optionally substituted, hydrocarbyl group, and R" is hydrogen or a C$_1$-C$_{30}$, optionally substituted, hydrocarbyl group.

4B. The method of paragraph 1B, wherein A is selected from the group consisting of S, O, PR', NR', SiR"$_2$, and GeR"$_2$;
wherein R' is a C$_1$-C$_{30}$, optionally substituted, hydrocarbyl group, and R" is hydrogen or a C$_1$-C$_{30}$, optionally substituted, hydrocarbyl group.

5B. The method of paragraph 1B, wherein each X is independently selected from the group consisting of a C$_1$-C$_{20}$ hydrocarbyl group, a hydride, an alkoxide, a sulfide, a phosphide, a halide, a diene, an amine, a phosphine, an ether, and any combination thereof.

6B. The method of paragraph 2B, wherein each X is an alkyl group independently selected from the group consisting of methyl, ethyl, propyl, butyl, and pentyl.

7B. The method of paragraph 2B, wherein each X is a halide independently selected from the group consisting of fluoro, chloro, and bromo.

8B. The method of paragraph 1B, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

9B. The method of paragraph 1B, wherein M is Hf or Zr.

10B. The method of paragraph 8B, wherein M is Zr.

11B. The method of paragraph 1B, wherein the polymerized reaction product comprises at least about 80 mol % vinylidene-terminated polyalphaolefin based on total moles of olefins in the polymerized reaction product.

12B. The method of paragraph 1B, wherein the polymerized reaction product further comprises one or more polyalphaolefins comprising a vinyl group, a trisubstituted vinylene group, a disubstituted vinylene group, or any combination thereof.

13B. The method of paragraph 1B, wherein the polymerization reaction conditions comprise a reaction temperature of about 80° C. or more.

14B. The method of paragraph 1B, wherein the activator comprises an alumoxane.

15B. The method of paragraph 1B, wherein the activator comprises methylalumoxane.

16B. The method of paragraph 1B, wherein the activator comprises a non-coordinating anion.

17B. The method of paragraph 16B, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

18B. The method of paragraph 1B, wherein the alpha olefin comprises at least one $C_6$-$C_{32}$ alpha olefin.

19B. The method of paragraph 8B, wherein the alpha olefin comprises at least one $C_8$-$C_{14}$ alpha olefin.

20B. The method of paragraph 11B, wherein the alpha olefin comprises at least one alpha olefin selected from the group consisting of 1-octene, 1-decene, 1-dodecene, 1-tetradecene, and any combination thereof.

21B. A composition comprising:
a transition metal complex represented by the formula

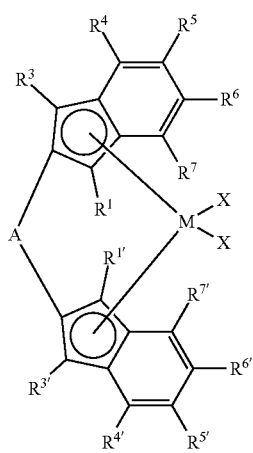

wherein:

M is a group 4 transition metal;

A is a bridging group having one bridging atom extending between a first indenyl ring and a second indenyl ring;

each X is independently an anionic ligand, or two Xs are joined and bound to M to form a metallocycle ring, or two Xs are joined to form a chelating ligand, a diene ligand, or an alkylidene ligand;

$R^1$, $R^{1'}$, $R^3$, $R^{3'}$, $R^4$, $R^{4'}$, $R^7$ and $R^{7'}$ are hydrogen; and $R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

22B. The composition of paragraph 21B, wherein A is selected from the group consisting of S, O, PR', NR', SiR"$_2$, GeR"$_2$, CH$_2$, CHR", and CR"$_2$;

wherein R' is a $C_1$-$C_{30}$, optionally substituted, hydrocarbyl group and R" is hydrogen or a $C_1$-$C_{30}$, optionally substituted, hydrocarbyl group.

23B. The composition of paragraph 21B, wherein A is selected from the group consisting of S, O, PR', NR', SiR"$_2$, GeR"$_2$, and CR"$_2$;

wherein R' is a $C_1$-$C_{30}$, optionally substituted, hydrocarbyl group and R" is hydrogen or a $C_1$-$C_{30}$, optionally substituted, hydrocarbyl group.

24B. The composition of paragraph 21B, wherein A is selected from the group consisting of S, O, PR', NR', SiR"$_2$, and GeR"$_2$ wherein R' is a $C_1$-$C_{30}$, optionally substituted, hydrocarbyl group and R" is hydrogen or a $C_1$-$C_{30}$, optionally substituted, hydrocarbyl group.

25B. The composition of paragraph 21B, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

26B. The composition of paragraph 22B, wherein each X is an alkyl group independently selected from the group consisting of methyl, ethyl, propyl, butyl, and pentyl.

27B. The composition of paragraph 22B, wherein each X is a halide independently selected from the group consisting of fluoro, chloro, and bromo.

28B. The composition of paragraph 21B, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

29B. The composition of paragraph 21B, wherein M is Hf or Zr.

30B. The composition of paragraph 24B, wherein M is Zr.

31B. A catalyst system comprising:
an activator; and
a transition metal complex represented by the formula

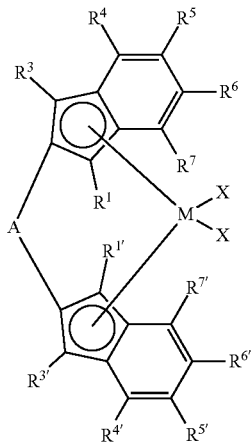

or a reaction product thereof;
wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure.

32B. The catalyst system of paragraph 31B, wherein A is selected from the group consisting of S, O, PR', NR', SiR"$_2$, GeR"$_2$, CH$_2$, CHR", and CR"$_2$;
wherein R' is a $C_1$-$C_{30}$, optionally substituted, hydrocarbyl group and R" is hydrogen or a $C_1$-$C_{30}$, optionally substituted, hydrocarbyl group.

33B. The catalyst system of paragraph 31B, wherein A is selected from the group consisting of S, O, PR', NR', SiR"$_2$, GeR"$_2$, and CR"$_2$;
wherein R' is a $C_1$-$C_{30}$, optionally substituted, hydrocarbyl group and R" is hydrogen or a $C_1$-$C_{30}$, optionally substituted, hydrocarbyl group.

34B. The catalyst system of paragraph 31B, wherein A is selected from the group consisting of S, O, PR', NR', SiR"$_2$ and GeR"$_2$
wherein R' is a $C_1$-$C_{30}$, optionally substituted, hydrocarbyl group and R" is hydrogen or a $C_1$-$C_{30}$, optionally substituted, hydrocarbyl group.

35B. The catalyst system of paragraph 31B, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

36B. The catalyst system of paragraph 32B, wherein each X is an alkyl group independently selected from the group consisting of methyl, ethyl, propyl, butyl, and pentyl.

37B. The catalyst system of paragraph 32B, wherein each X is a halide independently selected from the group consisting of fluoro, chloro, and bromo.

38B. The catalyst system of paragraph 31B, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

39B. The catalyst system of paragraph 31B, wherein M is Hf or Zr.

40B. The catalyst system of paragraph 38B, wherein M is Zr.

41B. The catalyst system of paragraph 31B, wherein the activator comprises an alumoxane.

42B. The catalyst system of paragraph 31B, wherein the activator comprises methylalumoxane.

43B. The catalyst system of paragraph 31B, wherein the activator comprises a non-coordinating anion.

44B. The catalyst system of paragraph 43B, wherein the non-coordinating anion is selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

To facilitate a better understanding of the disclosure herein, the following examples of preferred or representative embodiments are given. In no way should the following examples be read to limit, or to define, the scope of the invention.

EXAMPLES

Syntheses.
Reagents were sourced as follows: 2-Bromoindan-1-ol (Aldrich), sodium sulfide nonahydrate (Aldrich), sodium sulfide hydrate of >60% purity (Acros), trioctyl methylammonium chloride (Aldrich), 2.5 M BuLi in hexanes (Chemetall GmbH), N-bromosuccinimide (NBS) (Merck), dimethyldichlorosilane (Acros), p-toluenesulfonic acid (TsOH) monohydrate (Aldrich), Na$_2$CO$_3$ (Merck), Na$_2$SO$_4$ (Akzo Nobel), silica gel 60 (40-63 µm; Merck), toluene (Merck), dichloromethane (Merck), n-hexane (Merck), ethyl acetate (Merck), dimethyl sulfoxides (DMSO) (Aldrich), ethanol (Merck), diisopropylamine (Aldrich), tetrahydrofuran (THF) (Merck), diethyl ether (Merck), chloroform-d (Deutero GmbH), dichloromethane-d$_2$ (Deutero GmbH), and DMSO-d$_6$ (Deutero GmbH). Diethyl ether and THF for organometallic syntheses were freshly distilled from sodium benzophenone ketyl. Chloroform-d and dichloromethane-d$_2$ used to study moisture sensitive compounds were dried over 4 Å molecular sieves.

4,7-Dimethyl-1H-indene was prepared as described in International Patent Application Publication WO 2015/009479. 5,6-Dimethyl-1H-indene was prepared as described in EP 0955304. Zr(NMe$_2$)$_4$ was prepared as described in *J. Am. Chem. Soc.*, 1996, v. 118, pp. 8024-8033. ZrCl$_2$(NMe$_2$)$_2$(THF)$_2$ was prepared as described in *Organometallics*, 2005, v. 24, pp. 4760-4773.

Example 1: Synthesis of 2,2'-(sulfanediyl)bis(η⁵-5, 6-dimethyl-1H-inden-2-yl)zirconium dichloride (Catalyst 1)

Synthesis of the title compound was carried out in five synthetic steps from 5,6-dimethyl-1H-indene as follows.

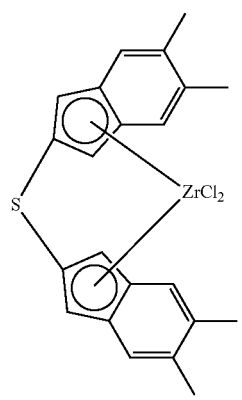

Catalyst 1

2-Bromo-5,6-dimethylindan-1-ol

To a solution of 13.2 g (91.8 mmol) of 5,6-dimethyl-1H-indene in a mixture of 150 ml of DMSO and 4 ml of water was added 17.2 g (96.3 mmol) of NBS portionwise over 30 minutes at 20° C. The orange solution was stirred overnight at room temperature. The resulting mixture was poured into 500 ml of water, and the obtained suspension was extracted with ethyl acetate (3×250 ml). The combined organic extract was washed with water (5×500 ml), dried over $Na_2SO_4$, and then evaporated to dryness. The residue was washed with 300 ml of hexane and dried in vacuo. Yield 19.7 g (89%) of a white powder. $^1$H NMR (CDCl$_3$, 400 MHz): δ 7.18 (s, 1H), 7.00 (s, 1H), 5.26 (t, J=5.5 Hz, 1H), 4.24-4.27 (m, 1H), 3.52 (dd, J=16.0, 7.0 Hz, 1H), 3.15 (dd, J=16.1, 6.6 Hz, 1H), 2.26 (s, 3H), 2.25 (s, 3H), 2.21 (d, J=5.8 Hz, 1H).

2,2'-Thiobis(5,6-dimethylindan-1-ol)

To a solution of 19.7 g (81.7 mmol) of 2-bromo-5,6-dimethylindan-1-ol in 500 ml of ethanol was added 5.32 g (40.9 mmol, >60% purity) of sodium sulfide hydrate. The obtained mixture was refluxed for 5 hours and then evaporated to dryness. To the residue was added 200 ml of water, and the resulting mixture was extracted with ethyl acetate (3×200 ml). The combined extract was dried over $Na_2SO_4$ and then evaporated to dryness. The residue was washed with 30 ml of ethanol and dried in vacuo. Yield 11.2 g (77%) of a white crystalline solid as 3:1 mixture of two diastereomers. Major isomer. $^1$H NMR (DMSO-d$_6$, 400 MHz): δ 7.10 (s, 2H), 6.99 (s, 2H), 5.35 (br s, 2H), 4.37 (br s, 2H), 4.19 (d, J=2.77 Hz, 2H), 3.12-3.21 (m, 2H), 2.60-2.67 (m, 2H), 2.17 (s, 12H). $^{13}$C NMR (DMSO-d$_6$, 101 MHz): 139.2, 138.5, 135.3, 134.1, 126.2, 125.8, 78.6, 56.1, 19.4. Minor isomer. $^1$H NMR (DMSO-d$_6$, 400 MHz): δ 7.07 (s, 2H), 6.97 (s, 2H), 5.23 (br s, 2H), 4.46 (br s, 2H), 4.09 (d, J=2.77 Hz, 2H), 3.12-3.21 (m, 2H), 2.60-2.67 (m, 2H), 2.17 (s, 12H). $^{13}$C NMR (DMSO-d$_6$, 101 MHz): 138.7, 138.7, 135.4, 134.2, 126.1, 125.7, 79.2, 55.9, 19.3.

Bis(5,6-dimethyl-1H-inden-2-yl)sulfane

To a solution of 11.2 g (31.6 mmol) of 2,2'-thiobis(5,6-dimethylindan-1-ol) in 500 ml toluene was added 4.20 g (22.1 mmol) of TsOH monohydrate. The obtained mixture was refluxed with a Dean-Stark head for 90 minutes and then cooled to room temperature using a water bath. The resulting solution was washed with 10% $Na_2CO_3$, the organic layer was separated, and the aqueous layer was extracted with dichloromethane (3×100 ml). The combined organic extract was dried over $Na_2SO_4$ and then passed through a short pad of silica gel 60 (40-63 µm). The silica gel pad was additionally washed with 100 ml of dichloromethane. The combined organic eluent was evaporated to dryness, and the product was obtained by flash chromatography on silica gel 60 (40-63 µm) using hexane-ethyl acetate (5:1 vol./vol.) as the eluent. Yield 7.55 g (75%) of a white solid. $^1$H NMR (CDCl$_3$, 400 MHz): δ 7.21 (s, 2H), 7.13 (s, 2H), 6.87 (s, 2H), 3.55 (s, 4H), 2.34 (s, 12H). $^{13}$C NMR (CDCl$_3$, 101 MHz): δ 142.3, 141.2, 138.7, 134.7, 132.9, 124.7, 121.4, 42.1, 19.9.

2,2'-(Sulfanediyl)bis(η⁵-5,6-dimethyl-1H-inden-2-yl)zirconium bis(dimethylamide)

A solution of 1.10 g (4.14 mmol) of Zr(NMe$_2$)$_4$ and 1.32 g (4.14 mmol) of bis(5,6-dimethyl-1H-inden-2-yl)sulfane in 50 ml of toluene was stirred for 48 hours at 110° C. The hot solution was then passed through a short pad of Celite 503, which was additionally washed with 50 ml of hot toluene, and the filtrate was then evaporated to dryness. Yield 0.87 g (43%) of a powder product. Anal, calcd. for $C_{26}H_{32}N_2SZr$: C, 62.98; H, 6.51. Found: C, 63.29; H, 6.82. $^1$H NMR (CD$_2$Cl$_2$, 400 MHz): δ 7.22 (s, 4H), 6.00 (s, 4H), 2.38 (s, 12H), 2.19 (s, 12H). $^{13}$C NMR (CD$_2$Cl$_2$, 101 MHz): δ 133.1, 128.3, 121.8, 100.6, 46.5, 20.0.

2,2'-(Sulfanediyl)bis(η⁵-5,6-dimethyl-1H-inden-2-yl)zirconium dichloride (Catalyst 1)

To a solution of 0.70 g (1.41 mmol) of 2,2'-(sulfanediyl)bis(η⁵-5,6-dimethyl-1H-inden-2-yl)zirconium bis(dimethylamide) in 50 ml toluene was added 0.91 g (7.05 mmol) of dimethyldichlorosilane, and the resulting solution was stirred at 50° C. overnight. The solution was passed through a short pad of Celite 503, which was additionally washed with 50 ml of hot toluene, and the filtrate was evaporated to dryness. The residue was washed with 50 ml of hot hexane and then dried in vacuo. Yield 0.54 g (80%) of a yellow solid. Anal, calcd. for $C_{22}H_{20}Cl_2SZr$: C, 55.21; H, 4.21. Found: C, 55.53; H, 4.48. $^1$H NMR (CD$_2$Cl$_2$, 400 MHz): δ 7.22 (s, 4H), 7.08 (s, 4H), 2.28 (s, 12H).

Example 2: Synthesis of 2,2'-(sulfanediyl)bis(η⁵-1H-inden-2-yl)zirconium dichloride (Comparative Catalyst 1)

Synthesis of the title compound was carried out in four synthetic steps from 2-bromoindan-1-ol as follows.

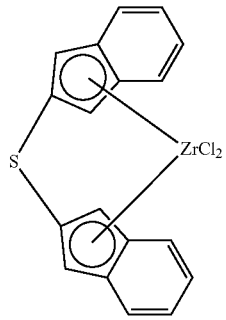

Comparative Catalyst 1

2,2'-Thiodiindan-1-ol

A mixture of 55.1 g (259 mmol) 2-bromoindan-1-ol, 37.5 g (156 mmol) of sodium sulfide nonahydrate, and 1.88 g (5.00 mmol) of trioctyl methylammonium chloride in 1,000 ml of water was refluxed for 4 hours. After cooling to room temperature, the resulting mixture was extracted with dichloromethane (3×500 ml). The combined organic extract was washed with water (2×200 ml), dried over $Na_2SO_4$, and then evaporated to dryness. The residue was washed with 30 ml of ethanol and then dried in vacuo. Yield 19.3 g (50%) of a white solid. $^1$H NMR (DMSO-$d_6$, 400 MHz): δ 7.26-7.34 (m, 2H), 7.10-7.27 (m, 6H), 5.38 (d, J=4.1 Hz, 1H), 5.29 (d, J=4.4 Hz, 1H), 4.46 (m, 1H), 4.36 (ddd, J=9.7, 3.7, 3.4 Hz, 1H), 4.23 (d, J=3.1 Hz, 1H), 4.13 (d, J=3.1 Hz, 1H), 3.21 (dt, J=16.2, 6.7 Hz, 2H), 2.72 (dd, J=6.4, 3.6 Hz, 1H), 2.67 (dd, J=6.4, 3.6 Hz, 1H).

Di(1H-inden-2-yl)sulfane

To a solution of 19.3 g (64.7 mmol) of 2,2'-thiodiindan-1-ol in 1,000 ml toluene was added 9.41 g (49.5 mmol) of TsOH monohydrate. The mixture was refluxed with a Dean-Stark head for 90 minutes and then cooled to room temperature using a water bath. The resulting solution was washed with 10% $Na_2CO_3$, the organic layer was separated, and the aqueous layer was extracted with dichloromethane (3×150 ml). The combined organic extract was dried over $Na_2SO_4$ and then passed through a short pad of silica gel 60 (40-63 μm), which was additionally washed with 100 ml of dichloromethane. The combined organic eluent was then evaporated to dryness. The crude product was purified by flash chromatography on silica gel 60 (40-63 μm) using 5:1 hexane-ethyl acetate (vol./vol.). Yield 13.4 g (79%) of a white solid. $^1$H NMR (CDCl$_3$, 400 MHz): δ 7.38 (d, J=7.5 Hz, 2H), 7.22-7.32 (m, 4H), 7.16 (td, J=1.1, 1.7 Hz, 2H), 6.89 (s, 2H), 3.59 (s, 4H). $^{13}$C NMR (CDCl$_3$, 101 MHz): δ 144.3, 143.4, 139.8, 133.1, 126.6, 124.7, 123.4, 120.3, 42.5.

2,2'-(Sulfanediyl)bis($\eta^5$-1H-inden-2-yl)zirconium bis(dimethylamide)

A solution of 2.04 g (7.62 mmol) of Zr(NMe$_2$)$_4$ and 2.00 g (7.62 mmol) of di(1H-inden-2-yl)sulfane in 50 ml of toluene was stirred for 48 hours at 110° C. The hot solution was then passed through a short pad of Celite 503, which was additionally washed with 50 ml of hot toluene, and the filtrate was evaporated to dryness. Yield 1.20 g (36%) of a powder product. Anal, calcd. for $C_{22}H_{24}N_2SZr$: C, 60.09; H, 5.50. Found: C, 60.32; H, 5.71. $^1$H NMR (CD$_2$Cl$_2$, 400 MHz): δ 7.50-7.55 (m, 4H), 6.92-6.98 (m, 4H), 6.20 (s, 4H), 2.43 (s, 12H). $^{13}$C NMR (CD$_2$Cl$_2$, 101 MHz): δ 129.7, 124.0, 123.1, 112.1, 102.2, 46.6.

2,2'-(Sulfanediyl)bis($\eta^5$-1H-inden-2-yl)zirconium dichloride (Comparative Catalyst 1)

To a solution of 0.70 g (1.59 mmol) of 2,2'-(sulfanediyl)bis($\eta^5$-1H-inden-2-yl)zirconium bis(dimethylamide) in 50 ml toluene was added 1.03 g (7.95 mmol) of dimethyldichlorosilane, and the resulting solution was stirred at 50° C. overnight. The solution was passed through a short pad of Celite 503, which was additionally washed with 50 ml of hot toluene. The combined filtrate was evaporated to dryness. The residue was washed with ml of hot hexane and then dried in vacuo. Yield 0.55 g (82%) of a yellow solid. Anal, calcd. for $C_{18}H_{12}Cl_2SZr$: C, 51.17; H, 2.86. Found: C, 51.29; H, 3.00. $^1$H NMR (CD$_2$Cl$_2$, 400 MHz): δ 7.50-7.57 (m, 4H), 7.25-7.31 (m, 4H), 6.39 (s, 4H).

Example 3: 2,2'-(Sulfanediyl)bis($\eta^5$-4,7-dimethyl-1H-inden-2-yl)zirconium dichloride (Comparative Catalyst 2)

Synthesis of the title compound was carried out in five synthetic steps from 4,7-dimethyl-1H-indene as follows.

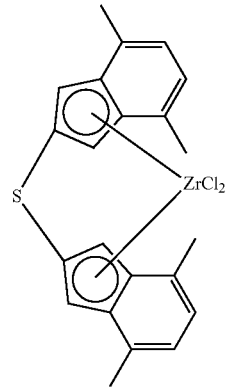

Comparative Catalyst 2

2-Bromo-4,7-dimethylindan-1-ol

To a solution of 39.6 g (274 mmol) of 4,7-dimethyl-1H-indene in 300 ml of DMSO and 10 ml of water was added 51.2 g (288 mmol) of NBS portionwise over 30 minutes at 20° C. The orange solution was stirred overnight at room temperature. The resulting mixture was then poured into 500 ml of water, and the obtained suspension was extracted with ethyl acetate (3×250 ml). The combined organic extract was washed with water (5×500 ml), dried over $Na_2SO_4$, and then evaporated to dryness. The residue was washed with 300 ml of hexane and dried in vacuo. Yield 62.2 g (94%) of a white powder. $^1$H NMR (CDCl$_3$, 400 MHz): δ 7.07 (d, J=7.7 Hz, 1H), 7.00 (d, J=7.7 Hz, 1H), 5.36 (d, J=2.6 Hz, 1H), 4.36 (m, 1H), 3.63 (dd, J=17.3, 6.5 Hz, 1H), 3.14 (dd, J=17.3, 3.5 Hz, 1H), 2.66 (s, 1H), 2.38 (s, 3H), 2.00 (s, 3H).

2,2'-Thiobis(4,7-dimethylindan-1-ol)

To a solution of 62.2 g (258 mmol) of 2-bromo-4,7-dimethylindan-1-ol in 1,000 ml of ethanol was added 16.8 g (129 mmol, >60% purity) of sodium sulfide hydrate. The resulting mixture was refluxed for 5 hours and then evaporated to dryness. To the residue was added 500 ml of water, and the obtained mixture was extracted with ethyl acetate (3×500 ml). The combined extract was dried over $Na_2SO_4$ and then evaporated to dryness. The residue was washed with 50 ml of ethanol and dried in vacuo. Yield 35.0 g (77%) of a white crystalline solid as 2:1 mixture of two diastereomers. Major isomer. $^1$H NMR (DMSO-$d_6$, 400 MHz): δ 6.86-6.98 (m, 2H), 5.13 (br s, 1H), 4.69 (t, J=4.3 Hz, 1H), 4.20 (s, 1H), 3.25-3.34 (m, 1H), 2.71 (d, J=17.0 Hz, 1H), 2.28 (s, 3H), 2.17 (s, 3H). Minor isomer. $^1$H NMR (DMSO-$d_6$, 400 MHz): δ 6.86-6.98 (m, 2H), 5.08 (br s, 1H), 4.52 (t, J=4.1 Hz, 1H), 4.30 (s, 1H), 3.16 (dd, J=16.8, 4.7 Hz, 1H), 2.65 (d, J=16.8 Hz, 1H), 2.37 (s, 3H), 2.16 (s, 3H).

Bis(4,7-dimethyl-1H-inden-2-yl)sulfane

To a solution of 12.6 g (35.7 mmol) of 2,2'-thiobis(4,7-dimethylindan-1-ol) in 500 ml toluene was added 4.93 g (25.9 mmol) of TsOH monohydrate. The mixture was refluxed with a Dean-Stark head for 90 minutes and then cooled to room temperature using a water bath. The resulting solution was washed with 10% $Na_2CO_3$, the organic layer was separated, and the aqueous layer was extracted with dichloromethane (3×100 ml). The combined organic extract was dried over $Na_2SO_4$ and then passed through a short pad of silica gel 60 (40-63 μm), which was additionally washed with 100 ml of dichloromethane. The combined organic eluent was thereafter evaporated to dryness. The crude product was purified by flash chromatography on silica gel 60 (40-63 μm) using 5:1 hexane-ethyl acetate (vol.:vol.). Yield 7.10 g (62%) of a white solid. $^1$H NMR (CDCl$_3$, 400 MHz): δ 7.00-7.10 (m, 4H), 6.94 (m, 2H), 3.50 (s, 4H), 2.42 (s, 6H), 2.31 (s, 6H). $^{13}$C NMR (CDCl$_3$, 101 MHz): δ 142.9, 142.1, 139.0, 132.1, 130.0, 128.0, 127.3, 126.1, 41.9, 18.3, 18.2.

2,2'-(Sulfanediyl)bis($\eta^5$-4,7-dimethyl-1H-inden-2-yl)zirconium bis(dimethylamide)

To a solution of 0.64 g (6.32 mmol) of diisopropylamine in 50 ml of diethyl ether was added 2.50 ml (6.32 mmol) of 2.5 M $^n$BuLi in hexanes at −30° C. The obtained solution was allowed to warm to room temperature, stirred for 1 hour, and then 1.00 g (3.16 mmol) of bis(4,7-dimethyl-1H-inden-2-yl)sulfane was added. The resulting mixture was then stirred overnight at room temperature. Volatiles were removed under reduced pressure, and 50 ml of THF was added to the residue. Thereafter, 1.24 g (3.16 mmol) of $ZrCl_2(NMe_2)_2(THF)_2$ was added to the THF solution at −78° C. The resulting mixture was then allowed to warm to room temperature and stirred overnight. The mixture was then warmed to 50° C. and passed through a short pad of Celite 503, which was additionally washed with 50 ml of hot toluene. The combined filtrate was evaporated to dryness. Yield 0.63 g (40%) of a powder. Anal, calcd. for $C_{26}H_{32}N_2SZr$: C, 62.98; H, 6.51. Found: C, 63.35; H, 6.73. $^1$H NMR (CD$_2$Cl$_2$, 400 MHz): δ 6.73 (s, 4H), 6.19 (s, 4H), 2.41 (s, 12H), 2.38 ppm (s, 12H). $^{13}$C NMR (CD$_2$Cl$_2$, 101 MHz): δ 131.0, 129.0, 124.0, 112.8, 102.2, 45.6, 19.1.

2,2'-(Sulfanediyl)bis($\eta^5$-4,7-dimethyl-1H-inden-2-yl)zirconium dichloride (Comparative Catalyst 2)

To a solution of 0.64 g (1.26 mmol) of 2,2'-(sulfanediyl)bis($\eta^5$-4,7-dimethyl-1H-inden-2-yl)zirconium bis(dimethylamide) in 50 ml toluene was added 0.81 g (6.30 mmol) of dimethyldichlorosilane, and the resulting solution was stirred at 50° C. overnight. The solution was passed through a short pad of Celite 503, which was additionally washed with 50 ml of hot toluene. The filtrate was then evaporated to dryness. The residue was washed with 50 ml of hot hexane and then dried in vacuo. Yield 0.38 g (63%) of a yellow solid. Anal, calcd. for $C_{22}H_{20}Cl_2SZr$: C, 55.21; H, 4.21. Found: C, 55.50; H, 4.44. $^1$H NMR (CD$_2$Cl$_2$, 400 MHz): δ 6.96 (s, 4H), 6.31 (s, 4H), 2.41 (s, 12H). $^{13}$C NMR (CD$_2$Cl$_2$, 101 MHz): δ 142.6, 131.7, 131.2, 126.2, 106.6, 19.1.

Polymerization Reagents.

Pre-catalyst solutions were made using a given metallocene complex dissolved in toluene (ExxonMobil Chemical-anhydrous, stored under $N_2$) (98%), typically at a concentration of 0.5 mmol/L. When noted, some metallocene complexes were pre-alkylated using triisobutyl aluminum (TIBAL, neat, AkzoNobel) or tri-n-octyl aluminum (TNOAL, neat, AkzoNobel). Prealkylation was performed by first dissolving the metallocene complex in the appropriate amount of toluene, and then adding 20 equivalents of TIBAL or TNOAL to give final pre-catalyst solution concentrations of 0.5 mmol metallocene complex/L and 10 mmol TIBAL/L or TNOAL/L.

Activation of the metallocene complexes was performed using either methylalumoxane (MAO, 10 wt % in toluene, Albemarle Corp.), or dimethylanilinium tetrakisperfluorophenylborate (Boulder Scientific or Albemarle Corp). MAO was typically used as a 0.5 wt % or 1.0 wt % toluene solution. Micromoles of MAO reported below are based on the micromoles of aluminum in MAO, which has a formula weight of 58.0 grams/mole. Dimethylanilinium tetrakisperfluorophenylborate was typically used as a 5 mmol/L solution in toluene.

For polymerization runs using dimethylanilinium tetrakisperfluorophenylborate, tri-n-octylaluminum (TNOAL, neat, AkzoNobel) was also used as a scavenger prior to introduction of the activator and metallocene complex into the reactor. TNOAL was typically used as a 5 mmol/L solution in toluene.

Solvents, polymerization grade toluene and/or isohexanes were supplied by ExxonMobil Chemical Co. and were purified by passage through a series of columns: two 500 cc OXYCLEAR cylinders in series from Labclear (Oakland, Calif.), followed by two 500 cc columns in series packed with dried 3 Å molecular sieves (8-12 mesh; Aldrich Chemical Company), and two 500 cc columns in series packed with dried 5 Å molecular sieves (8-12 mesh; Aldrich Chemical Company).

1-octene (98%) (Aldrich Chemical Company) and 1-decene (Aldrich Chemical Company) were dried by stirring over NaK for at least two hours to overnight followed by filtration through basic alumina (Aldrich Chemical Company, Brockman Basic 1). 1-Decene can also be purified by mixing 1 liter of untreated raw material with 20 grams of activated 13X molecular sieves (activated by calcination at 200° C. for at least four hours under a purge stream of dry nitrogen gas), and 10 grams of OXICLEAR catalyst (purchased from Altech Associates, Inc. or Deerfield, Ill. 60115) for at least two days inside a glove box under a dry nitrogen atmosphere. The molecular sieves and deoxygenation catalyst are then removed by filtration in the glove box to provide purified 1-decene. Alternatively, the feeds can be purified by passage through a bed of activated 13X molecular sieve alone under nitrogen atmosphere.

Polymerization grade ethylene was purified by passage through a series of columns: 500 cc OXYCLEAR cylinder from Labclear (Oakland, Calif.) followed by a 500 cc column packed with dried 3 Å molecular sieves (8-12 mesh; Aldrich Chemical Company), and a 500 cc column packed with dried 5 Å molecular sieves (8-12 mesh; Aldrich Chemical Company).

Polymerization grade propylene was purified by passage through a series of columns: 2,250 cc OXICLEAR cylinder from Labclear followed by a 2,250 cc column packed with 3 Å molecular sieves (8-12 mesh; Aldrich Chemical Company), then two 500 cc columns in series packed with 5 Å molecular sieves (8-12 mesh; Aldrich Chemical Company), then a 500 cc column packed with SELEXSORB CD (BASF), and finally a 500 cc column packed with SELEXSORB COS (BASF).

Reactor Description and Preparation:

Polymerizations were conducted in an inert atmosphere ($N_2$) drybox using autoclaves equipped with an external heater for temperature control, glass inserts (internal volume of reactor=23.5 ml for $C_2$, $C_2/C_8$, and $C_{10}$ runs; 22.5 ml for $C_3$ runs), septum inlets, a regulated supply of nitrogen, ethylene and propylene, and disposable PEEK mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-octene Copolymerization (EO):

The reactor was prepared as described above, and then purged with ethylene. For MAO activated runs, toluene, 1-octene (100 μL when used), and activator (MAO) were added via syringe at room temperature and atmospheric pressure. The reactor was then brought to process temperature (80° C.) and charged with ethylene to process pressure (75 psig=618.5 kPa or 200 psig=1480.3 kPa) while stirring at 800 RPM. The pre-catalyst solution was then added via syringe to the reactor at process conditions. Ethylene was allowed to enter (through the use of computer-controlled solenoid valves) the autoclaves during polymerization to maintain reactor gauge pressure (+1-2 psig). The reactor temperature was monitored and typically maintained within +/−1° C. Polymerizations were halted by addition of approximately 50 psi $O_2$/Ar (5 mole % $O_2$) gas mixture to the autoclave for approximately 30 seconds. The polymerizations were quenched after a predetermined cumulative amount of ethylene had been added (Quench Value in psid) or for a maximum of 30 minutes polymerization time (maximum quench time). Actual quench times are reported. Afterward, the reactors were cooled and vented. Polymers were isolated after solvent removal in vacuo. Yields reported include total weight of polymer and residual catalyst. Catalyst activity is reported as grams of polymer per mmol metallocene compound per hour of reaction time (gP/mmol cat·hr). Ethylene homopolymerization runs and ethylene/1-octene copolymerization runs are summarized in Table 2 below.

Propylene Polymerization (PP):

The reactor was prepared as described above, heated to 40° C., and then purged with propylene gas at atmospheric pressure. For MAO-activated runs, toluene, MAO, and propylene (1.0 ml) were added via syringe. The reactor was then heated to process temperature (70° C. or 100° C.) while stirring at 800 RPM. The pre-catalyst solution was added via syringe with the reactor at process conditions. The reactor temperature was monitored and typically maintained within +/−1° C. Polymerizations were halted by addition of approximately 50 psi $O_2$/Ar (5 mole % $O_2$) gas mixture to the autoclaves for approximately 30 seconds. The polymerizations were quenched based on a predetermined pressure loss of approximately 8 psi (max quench value in psi) or for a maximum of 30 minutes polymerization time. The reactors were then cooled and vented. The polymers were isolated after solvent removal in vacuo. Actual quench times are reported. Yields reported include total weight of polymer and residual catalyst. Catalyst activity is reported as grams of polymer per mmol metallocene complex per hour of reaction time (gP/mmol cat·hr). Propylene homopolymerization examples are summarized in Table 3 below.

1-Decene Polymerizations:

The reactor was prepared as described above. Isohexane, 1-decene and scavenger (TNOAL, 0.6 μmol) were added via syringe at room temperature and atmospheric pressure. The reactor was then brought to process temperature (T=60, 85, or 110° C.) while stirring at 800 RPM. The activator solution, followed by the pre-catalyst solution, was injected via syringe to the reactor at process conditions. The reactor temperature was monitored and typically maintained within +/−1° C. The polymerization was halted after 60 minutes of reaction time. The reactor was then cooled and vented. The polymer was isolated after solvent removal in vacuo. Reported yields include total weight of polymer and residual catalyst. Catalyst activity is reported as grams of polymer per mmol metallocene complex per hour of reaction time (g P/mmol cat·hr). 1-Decene homopolymerizations are summarized in Table 4 below.

"Quench Value (psi)" for ethylene-based polymerization runs is the set maximum amount of ethylene uptake (conversion) for the experiment. If a polymerization quench time was less than the maximum time set, then the polymerization was run until the set maximum value of ethylene uptake was reached. For propylene and 1-decene homopolymerization runs, quench value indicates the maximum set pressure loss (conversion) of propylene or 1-decene during the polymerization.

Polymer Characterization.

For analytical testing, polymer sample solutions were prepared by dissolving polymer in 1,2,4-trichlorobenzene (TCB, 99+% purity) containing 2,6-di-tert-butyl-4-methyl phenol (BHT, Sigma-Aldrich, 99%) at 165° C. in a shaker oven for approximately 3 hours. The typical concentration of polymer in solution was from 0.1 to 0.9 mg/ml with a BHT concentration of 1.25 mg BHT/ml of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector (ELSD) and calibrated using polystyrene standards (Polymer Laboratories: Polystyrene Calibration Kit S-M-10: Mp (peak Mw) between 5.000 and 3,390,000). Alternatively, samples were measured by Gel Permeation Chromatography using a Symyx Technology GPC equipped with dual wavelength infrared detector and calibrated using polystyrene standards (Polymer Laboratories: Polystyrene Calibration Kit S-M-10: Mp (peak Mw) between 580 and 3,039,000). Samples (250 μL of a polymer solution in TCB were injected into the system) were run at an eluent flow rate of 2.0 ml/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards. Molecular weight data is reported in the Tables below under the headings Mn, Mw and PDI as defined above. PDI values marked with an "*" indicate that ELSD was used; no additional marking indicates that dual wavelength infrared detection was used.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period. The results are reported in the Tables under the heading, $T_m$.

Proton NMR ($^1$H-NMR) was used to determine the number average molecular weight of the unsaturated PAO and the quantitative breakdown of the olefinic structure types therein (e.g., vinyl, vinylene, di-substituted vinylene, tri-substituted vinylene, and vinylidene).

Specifically, an NMR instrument of 400 or 500 MHz was run under the following conditions: a ~30° flip angle RF pulse, 128 scans, with a relaxation delay of 5 seconds between pulses; sample (60-100 mg) dissolved in CDCl$_3$ (deuterated chloroform) in a 5 mm NMR tube; and signal collection temperature at 25° C. The following approach was taken to determine the concentrations of the various olefins among all of the olefins from an NMR spectrum. First, peaks corresponding to different types of hydrogen atoms in vinyls (T1), vinylidenes (T2), di-substituted vinylenes (i.e., vinylenes, T3), and tri-substituted vinylenes (i.e., trisubstituted or trisubs, T4) were identified at the peak regions specified in Table 1 below. Second, areas of each of the above peaks (A1, A2, A3, and A4, respectively) were then determined by integration. Third, quantities of each type of olefin (Q1, Q2, Q3, and Q4, respectively) in moles were calculated (as A1/2, A2/2, A3/2, and A4, respectively). Fourth, the total quantity of all olefins (Qt) in moles were calculated as the sum total of all four types (Qt=Q1+Q2+Q3+Q4). Finally, the molar concentrations ($C_1$, $C_2$, $C_3$, and $C_4$, respectively, in mol %) of each type of olefin, on the basis of the total molar quantity of all of the olefins, were then calculated (in each case, Ci=100*Qi/Qt).

TABLE 1

| Type No. | Olefin Structure | Peak Region (ppm) | Peak Area | Number of Hydrogen Atoms | Quantity of Olefin (mol) | Concentration of Olefin (mol %) |
|---|---|---|---|---|---|---|
| T1 | CH$_2$=CHR$^1$ | 4.95-5.10 | A1 | 2 | Q1 = A1/2 | C1 |
| T2 | CH$_2$=CR$^1$R$^2$ | 4.65-4.84 | A2 | 2 | Q2 = A2/2 | C2 |
| T3 | CHR$^1$=CHR$^2$ | 5.31-5.55 | A3 | 2 | Q3 = A3/2 | C3 |
| T4 | CR$^1$R$^2$=CHR$^3$ | 5.11-5.30 | A4 | 1 | Q4 = A4 | C4 |

The number average molecular weight was determined by:

Mn={[Saturated+(vinylene+vinylidene+vinyl+trisubstituted×2)]/(vinylene+vinylidene+vinyl+trisubstituted×2)}×14("Saturated," "vinylene," "vinyl," and "trisubstituted" in this equation refer to peak area integration).

Example 4: Ethylene and Ethylene/1-Octene Polymerization

Ethylene polymerization or ethylene/1-octene co-polymerization was conducted using 0.025 µmol of metallocene compound and sufficient methylalumoxane activator to provide a 500:1 molar ratio of aluminum to zirconium. Polymerizations were conducted in 4.9 ml of toluene solvent at a reaction temperature of 80° C. Polymerization data is provided in Table 2.

TABLE 2

| Entry | Catalyst | C$_8$ (µL) | C$_2$ (psig) | Quench Value (psid) | Quench Time (s) | Yield (g) |
|---|---|---|---|---|---|---|
| 1 | 1 | 0 | 75 | 20 | 16 | 0.0849 |
| 2 | 1 | 0 | 75 | 20 | 16 | 0.0833 |
| 3 | 1 | 0 | 75 | 20 | 17 | 0.0828 |
| 4 | 1 | 100 | 75 | 20 | 17 | 0.0849 |
| 5 | 1 | 100 | 75 | 20 | 22 | 0.0898 |
| 6 | 1 | 100 | 75 | 20 | 18 | 0.0948 |
| 7 | 1 | 100 | 200 | 15 | 5 | 0.1503 |
| 8 | 1 | 100 | 200 | 15 | 4 | 0.1493 |
| 9 | 1 | 100 | 200 | 15 | 4 | 0.1443 |
| 10 | Comp. 1 | 0 | 75 | 20 | 81 | 0.0500 |
| 11 | Comp. 1 | 0 | 75 | 20 | 74 | 0.0551 |
| 12 | Comp. 1 | 0 | 75 | 20 | 71 | 0.0577 |
| 13 | Comp. 1 | 100 | 75 | 20 | 66 | 0.0544 |
| 14 | Comp. 1 | 100 | 75 | 20 | 72 | 0.0586 |
| 15 | Comp. 1 | 100 | 75 | 20 | 63 | 0.0581 |
| 16 | Comp. 1 | 100 | 200 | 15 | 27 | 0.0781 |
| 17 | Comp. 1 | 100 | 200 | 15 | 27 | 0.0792 |
| 18 | Comp. 1 | 100 | 200 | 15 | 24 | 0.0777 |
| 19 | Comp. 2 | 0 | 75 | 20 | 194 | 0.0827 |
| 20 | Comp. 2 | 0 | 75 | 20 | 102 | 0.0707 |
| 21 | Comp. 2 | 0 | 75 | 20 | 147 | 0.0764 |
| 22 | Comp. 2 | 100 | 75 | 20 | 77 | 0.0633 |
| 23 | Comp. 2 | 100 | 75 | 20 | 86 | 0.0677 |
| 24 | Comp. 2 | 100 | 75 | 20 | 77 | 0.0625 |
| 25 | Comp. 2 | 100 | 200 | 15 | 66 | 0.1071 |
| 26 | Comp. 2 | 100 | 200 | 15 | 68 | 0.1186 |
| 27 | Comp. 2 | 100 | 200 | 15 | 68 | 0.1154 |

TABLE 2-continued

| Entry | Activity (g$_{poly}$/mmol$_{cat}$·hr) | Mn (g/mol) | Mw (g/mol) | Mz (g/mol) | PDI (Mw/Mn) | T$_m$ (° C.) |
|---|---|---|---|---|---|---|
| 1 | 764,100 | 5,957 | 10,634 | 22,430 | 1.79 | 127.5 |
| 2 | 749,700 | 5,692 | 10,670 | 23,245 | 1.87 | 126.6 |
| 3 | 701,365 | 5,332 | 10,661 | 23,647 | 2.00 | 126.5 |
| 4 | 719,153 | 3,941 | 8,202 | 18,573 | 2.08 | 112.7 |
| 5 | 587,782 | 4,551 | 9,418 | 20,629 | 2.07 | 110.6 |
| 6 | 758,400 | 4,447 | 8,780 | 20,469 | 1.97 | 113.7 |
| 7 | 4,328,640 | 4,072 | 7,971 | 16,518 | 1.96 | 121.4 |
| 8 | 5,374,800 | 4,761 | 8,429 | 18,143 | 1.77 | 121.3 |
| 9 | 5,194,800 | 4,863 | 9,612 | 23,615 | 1.98 | 121.5 |
| 10 | 88,889 | 3,902 | 7,929 | 28,629 | 2.03 | 125.9 |
| 11 | 107,222 | 3,820 | 7,661 | 24,811 | 2.01 | 126.4 |
| 12 | 117,025 | 3,844 | 7,218 | 19,135 | 1.88 | 127.4 |
| 13 | 118,691 | 3,654 | 6,701 | 15,844 | 1.83 | 109.9 |
| 14 | 117,200 | 3,966 | 6,808 | 14,208 | 1.72 | 120.8 |
| 15 | 132,800 | 3,576 | 6,562 | 14,462 | 1.83 | 110.4 |
| 16 | 416,533 | 3,355 | 6,091 | 12,884 | 1.82 | 118.0 |
| 17 | 422,400 | 3,662 | 6,205 | 12,347 | 1.69 | 117.8 |

TABLE 2-continued

| | | | | | | |
|---|---|---|---|---|---|---|
| 18 | 466,200 | 3,271 | 5,857 | 12,398 | 1.79 | 118.0 |
| 19 | 61,386 | 78,470 | 219,155 | 594,861 | 2.79 | 135.2 |
| 20 | 99,812 | 92,881 | 195,335 | 475,137 | 2.10 | 134.7 |
| 21 | 74,841 | 89,658 | 211,976 | 538,909 | 2.36 | 134.7 |
| 22 | 118,379 | 68,944 | 145,732 | 304,122 | 2.11 | 111.5 |
| 23 | 113,358 | 71,561 | 186,671 | 670,594 | 2.61 | 111.9 |
| 24 | 116,883 | 59,824 | 145,322 | 318,000 | 2.43 | 110.8 |
| 25 | 233,673 | 138,375 | 287,718 | 700,674 | 2.08 | 120.4 |

TABLE 2-continued

| | | | | | | |
|---|---|---|---|---|---|---|
| 26 | 251,153 | 143,986 | 289,864 | 714,519 | 2.01 | 120.3 |
| 27 | 244,376 | 137,005 | 295,547 | 687,241 | 2.16 | 120.1 |

As shown, Catalyst 1 exhibited considerably higher catalyst activity values for ethylene polymerization or copolymerization than did either of Comparative Catalysts 1 and 2. Although Catalyst 1 afforded higher catalyst activity values relative to Comparative Catalyst 1, the Mn values obtained with Catalyst 1 were only marginally higher, and PDI values and $T_m$ values were about the same. Yields obtained using Catalyst 1 were higher than those obtained with Comparative Catalyst 1. In contrast to the performance of Catalyst 1 and Comparative Catalyst 1, Comparative Catalyst 2 afforded higher Mn and PDI values.

Example 5: Propylene Polymerization

Propylene polymerization was conducted using 0.040 µmol of transition metal compound and sufficient methylalumoxane activator to provide a 500:1 molar ratio of aluminum to zirconium. Polymerizations were conducted using 1.0 ml propylene and 4.1 ml toluene solvent at a reaction temperature of 70° C. or 100° C. Quenching was conducted at 8 psid propylene uptake or for a maximum run time of 30 minutes. Polymerization data is provided in Table 3. Amorphous polypropylene was produced.

TABLE 3

| Entry | Catalyst | Reaction Temp. (° C.) | Quench Time (s) | Yield (g) | % Vinylene | % Trisub. | % Vinyl | % Vinylidene |
|---|---|---|---|---|---|---|---|---|
| 28 | 1 | 70 | 1567 | 0.0599 | | | | |
| 29 | 1 | 70 | 1773 | 0.0632 | 3.2 | 6.8 | 3.6 | 86.3 |
| 30 | 1 | 70 | 1800 | 0.0464 | | | | |
| 31 | 1 | 100 | 462 | 0.0550 | 3.6 | 6.3 | 7.0 | 83.1 |
| 32 | 1 | 100 | 562 | 0.0527 | | | | |
| 33 | 1 | 100 | 564 | 0.0512 | | | | |
| 34 | Comp. 1 | 70 | 1800 | 0.0078 | | | | |
| 35 | Comp. 1 | 70 | 1800 | 0.0076 | | | | |
| 36 | Comp. 1 | 70 | 1801 | 0.0081 | | | | |
| 37 | Comp. 1 | 100 | 1800 | 0.0319 | | | | |
| 38 | Comp. 1 | 100 | 1801 | 0.0306 | | | | |
| 39 | Comp. 1 | 100 | 1801 | 0.0319 | | | | |
| 40 | Comp. 2 | 70 | 132 | 0.1811 | 0.4 | 1.6 | 3.7 | 94.3 |
| 41 | Comp. 2 | 70 | 146 | 0.1711 | | | | |
| 42 | Comp. 2 | 70 | 127 | 0.1698 | | | | |
| 43 | Comp. 2 | 100 | 276 | 0.0780 | | | | |
| 44 | Comp. 2 | 100 | 231 | 0.0824 | 0.0 | 2.0 | 6.1 | 91.9 |
| 45 | Comp. 2 | 100 | 246 | 0.0800 | | | | |

| Entry | Activity ($g_{poly}$/mmol$_{cat}$ · hr) | Mn (g/mol) | Mw (g/mol) | Mz (g/mol) | PDI (Mw/Mn) |
|---|---|---|---|---|---|
| 28 | 3,440 | 1,519 | 2,650 | 6,184 | 1.74 |
| 29 | 3,208 | 1,638 | 2,685 | 5,669 | 1.64 |
| 30 | 2,320 | 1,593 | 2,748 | 5,976 | 1.72 |
| 31 | 10,714 | 1,073 | 1,903 | 4,749 | 1.77 |
| 32 | 8,440 | 1,139 | 2,122 | 5,593 | 1.86 |
| 33 | 8,170 | 1,084 | 1,683 | 3,126 | 1.55 |
| 34 | 390 | | | | |
| 35 | 380 | | | | |
| 36 | 405 | | | | |
| 37 | 1,595 | 1,445 | 4,442 | 15,610 | 3.07 |
| 38 | 1,529 | 1,631 | 4,851 | 15,647 | 2.97 |
| 39 | 1,594 | 1,388 | 4,261 | 14,902 | 3.07 |
| 40 | 123,477 | 9,954 | 19,985 | 48,080 | 2.01 |
| 41 | 105,473 | 10,153 | 19,683 | 44,056 | 1.94 |
| 42 | 120,331 | 9,585 | 19,630 | 44,376 | 2.05 |
| 43 | 25,435 | 4,910 | 8,435 | 17,197 | 1.72 |
| 44 | 32,104 | 3,973 | 7,996 | 18,085 | 2.01 |
| 45 | 29,268 | 3,840 | 7,461 | 15,961 | 1.94 |

As shown, Catalyst 1 afforded considerably lower Mn and PDI values than did Comparative Catalyst 2. Comparative Catalyst 1, in contrast, afforded much poorer yields and higher PDI values during propylene polymerization. In addition, the activity for Comparative Catalyst 1 was much lower than that of Catalyst 1 and Comparative Catalyst 2. As shown, a high percentage of vinylidene olefins was produced with both Catalyst 1 and Comparative Catalyst 2.

Example 6: 1-Decene Polymerization

1-Decene polymerization was conducted using 0.080 µmol of transition metal compound, after prealkylation with triisobutylaluminum hydride (TIBAL) or tri-n-octylaluminum (TNOAL) at a 20:1 molar ratio of Al:Zr, and sufficient [Me$_2$PhNH][B(C$_6$F$_5$)$_4$] to provide a 1:1 molar ratio of activator to transition metal. An additional 0.6 μmol TNOAL was added as a scavenger. Polymerizations were conducted using 2.0 ml 1-decene, 2.79 ml isohexane solvent and 0.21 ml toluene solvent at various reaction temperatures. Quenching was conducted at 60 minutes. Polymerization data is provided in Table 4.

TABLE 4

| Entry | Catalyst | Pre-Alkylation Agent | Rxn. Temp. (° C.) | Yield (g) |
|---|---|---|---|---|
| 46 | 1 | TIBAL | 60 | 0.3514 |
| 47 | 1 | TIBAL | 60 | 0.3463 |
| 48 | 1 | TNOAL | 60 | 0.2704 |
| 49 | 1 | TNOAL | 60 | 0.2494 |
| 50 | 1 | TIBAL | 85 | 0.7325 |
| 51 | 1 | TIBAL | 85 | 0.7107 |
| 52 | 1 | TNOAL | 85 | 0.5497 |
| 53 | 1 | TNOAL | 85 | 0.5604 |
| 54 | 1 | TIBAL | 110 | 0.3582 |
| 55 | 1 | TIBAL | 110 | 0.3353 |
| 56 | 1 | TNOAL | 110 | 0.1991 |
| 57 | 1 | TNOAL | 110 | 0.1631 |
| 58 | Comp. 1 | TIBAL | 60 | 0.1020 |
| 59 | Comp. 1 | TNOAL | 60 | 0.1203 |
| 60 | Comp. 1 | TNOAL | 60 | 0.0786 |
| 61 | Comp. 1 | TIBAL | 85 | 0.0733 |
| 62 | Comp. 1 | TIBAL | 85 | 0.0903 |
| 63 | Comp. 1 | TNOAL | 85 | 0.0492 |
| 64 | Comp. 1 | TNOAL | 85 | 0.0530 |
| 65 | Comp. 1 | TIBAL | 110 | 0.0140 |
| 66 | Comp. 1 | TIBAL | 110 | 0.0142 |
| 67 | Comp. 1 | TNOAL | 110 | 0.0097 |
| 68 | Comp. 1 | TNOAL | 110 | 0.0104 |
| 69 | Comp. 2 | TIBAL | 60 | 0.0226 |
| 70 | Comp. 2 | TIBAL | 60 | 0.0459 |
| 71 | Comp. 2 | TNOAL | 60 | 0.0544 |
| 72 | Comp. 2 | TNOAL | 60 | 0.0737 |
| 73 | Comp. 2 | TIBAL | 85 | 0.0101 |
| 74 | Comp. 2 | TIBAL | 85 | 0.0104 |
| 75 | Comp. 2 | TNOAL | 85 | 0.0114 |
| 76 | Comp. 2 | TNOAL | 85 | 0.0136 |
| 77 | Comp. 2 | TIBAL | 110 | 0.0021 |
| 78 | Comp. 2 | TIBAL | 110 | 0.0029 |
| 79 | Comp. 2 | TNOAL | 110 | 0.0030 |
| 80 | Comp. 2 | TNOAL | 110 | 0.0027 |

| Entry | Activity ($g_{poly}/mmol_{cat} \cdot hr$) | % Vinylene | % Trisub. | % Vinyl | % Vinylidene | Mn (g/mol) |
|---|---|---|---|---|---|---|
| 46 | 4,391 | 4.3 | 1.9 | 0.3 | 93.6 | 413 |
| 47 | 4,329 | | | | | |
| 48 | 3,380 | 4.5 | 1.8 | 0.4 | 93.3 | 427 |
| 49 | 3,117 | | | | | |
| 50 | 9,154 | 3.0 | 2.6 | 0.2 | 94.2 | 327 |
| 51 | 8,881 | | | | | |
| 52 | 6,869 | | | | | |
| 53 | 7,003 | 3.1 | 2.5 | 0.2 | 94.2 | 332 |
| 54 | 4,478 | 3.1 | 3.0 | 0.3 | 93.6 | 313 |
| 55 | 4,190 | | | | | |
| 56 | 2,488 | 3.3 | 2.7 | 0.3 | 93.7 | 326 |
| 57 | 2,038 | | | | | |
| 58 | 1,275 | 7.3 | 4.1 | 0.7 | 87.9 | 506 |
| 59 | 1,503 | 9.3 | 3.3 | 0.8 | 86.5 | 673 |
| 60 | 983 | | | | | |
| 61 | 916 | | | | | |
| 62 | 1,128 | 7.3 | 4.1 | 0.7 | 87.9 | 508 |
| 63 | 615 | | | | | |
| 64 | 662 | 8.2 | 4.3 | 0.8 | 86.7 | 540 |
| 65 | 175 | | | | | |
| 66 | 178 | | | | | |
| 67 | 121 | | | | | |
| 68 | 130 | | | | | |
| 69 | 282 | | | | | |
| 70 | 573 | 4.5 | 22.2 | 2.0 | 71.3 | 1845 |
| 71 | 680 | | | | | |
| 72 | 921 | 4.7 | 21.7 | 2.0 | 71.5 | 1847 |

TABLE 4-continued

| | |
|---|---|
| 73 | 126 |
| 74 | 130 |
| 75 | 142 |
| 76 | 170 |
| 77 | 26 |
| 78 | 36 |
| 79 | 37 |
| 80 | 34 |

As shown in Table 4, Catalyst 1 was significantly more active for 1-decene polymerization than was either of the Comparative Catalysts. In addition, Catalyst 1 produced a higher percentage of vinylidene olefins and a lower Mn value than did either of the Comparative Catalysts.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A composition comprising:
a transition metal complex represented by the formula

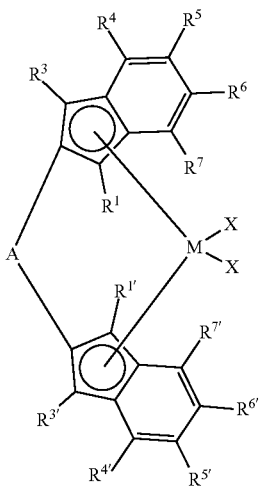

wherein:
M is a group 4 transition metal;
A is a bridging group having one bridging atom extending between a first indenyl ring and a second indenyl ring;
each X is independently an anionic ligand, or two Xs are joined and bound to M to form a metallocycle ring, or two Xs are joined to form a chelating ligand, a diene ligand, or an alkylidene ligand;
$R^1$, $R^{1'}$, $R^3$, $R^{3'}$, $R^4$, $R^{4'}$, $R^7$ and $R^{7'}$ are hydrogen; and
$R^5$, $R^{5'}$, $R^6$, and $R^{6'}$ are independently a $C_1$-$C_{10}$, optionally substituted, hydrocarbyl group, or $R^5$ and $R^6$ and/or $R^{5'}$ and $R^{6'}$ are bonded together to form an optionally substituted hydrocarbyl ring structure,
wherein A is selected from the group consisting of S, O, PR', NR', SiR''$_2$, GeR''$_2$, CH$_2$, CHR'', and CR''$_2$, and
wherein R' is a $C_1$-$C_{30}$, optionally substituted, hydrocarbyl group and R'' is hydrogen or a $C_1$-$C_{30}$, optionally substituted, hydrocarbyl group.

2. The composition of claim 1, wherein A is selected from the group consisting of S, O, PR', NR', SiR''$_2$, GeR''$_2$, and CR''$_2$.

3. The composition of claim 1, wherein A is selected from the group consisting of S, O, PR', NR', SiR''$_2$, and GeR''$_2$.

4. The composition of claim 1, wherein each X is independently selected from the group consisting of a $C_1$-$C_{20}$ hydrocarbyl group, a hydride, an alkoxide, a sulfide, a phosphide, a halide, a diene, an amine, a phosphine, an ether, and any combination thereof.

5. The composition of claim 1, wherein each X is an alkyl group independently selected from the group consisting of methyl, ethyl, propyl, butyl, and pentyl.

6. The composition of claim 1, wherein each X is a halide independently selected from the group consisting of fluoro, chloro, and bromo.

7. The composition of claim 1, wherein $R^5$, $R^6$, $R^{5'}$ and $R^{6'}$ are each an independently selected $C_1$-$C_{10}$, optionally substituted, alkyl group, or $R^5$ and $R^6$ and/or $R^{5'}$ and $R^{6'}$ are independently a $C_1$-$C_4$ hydrocarbyl group bonded together to form a ring structure.

8. The composition of claim 1, wherein M is Hf or Zr.

9. The composition of claim 1, wherein M is Zr.

10. A catalyst system comprising an activator and the composition of claim 1.

11. The catalyst system of claim 10, wherein the activator comprises an alumoxane.

12. The catalyst system of claim 10, wherein the activator comprises a non-coordinating anion.

* * * * *